US010452270B2

(12) United States Patent
Liu et al.

(10) Patent No.: US 10,452,270 B2
(45) Date of Patent: *Oct. 22, 2019

(54) STORAGE VIRTUALIZATION COMPUTER SYSTEM AND EXTERNAL CONTROLLER THEREFOR

(75) Inventors: Ling-Yi Liu, Taipei (TW); Tse-Han Lee, Taipei (TW); Michael Gordon Schnapp, New Taipei (TW); Yun-Huei Wang, New Taipei (TW); Chung-Hua Pao, New Taipei (TW)

(73) Assignee: Infortrend Technology, Inc., New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/615,653

(22) Filed: Sep. 14, 2012

(65) Prior Publication Data

US 2013/0013827 A1 Jan. 10, 2013

Related U.S. Application Data

(63) Continuation of application No. 10/707,871, filed on Jan. 20, 2004, now Pat. No. 8,301,809.

(60) Provisional application No. 60/483,926, filed on Jul. 2, 2003.

(51) Int. Cl.
*G06F 3/06* (2006.01)
*G06F 11/20* (2006.01)

(52) U.S. Cl.
CPC .......... *G06F 3/0607* (2013.01); *G06F 3/0611* (2013.01); *G06F 3/0617* (2013.01); *G06F 3/0658* (2013.01); *G06F 3/0664* (2013.01); *G06F 3/0683* (2013.01); *G06F 3/0689* (2013.01); *G06F 11/2089* (2013.01)

(58) Field of Classification Search
CPC ...... G06F 3/0607; G06F 3/0683; G06F 11/07; G06F 11/3055; G06F 3/0611; G06F 3/0617; G06F 3/0635; G06F 3/0689; G06F 11/2089; G06F 11/2094; G06F 11/2056; G06F 11/2005; G06F 67/1095
USPC .............................................. 710/74; 714/54
See application file for complete search history.

(56) References Cited

U.S. PATENT DOCUMENTS

| | | | |
|---|---|---|---|
| 5,928,367 A | 7/1999 | Nelson | |
| 5,987,566 A | 11/1999 | Vishlitzky | |
| 6,061,750 A | * 5/2000 | Beardsley et al. | 710/74 |
| 6,061,752 A | 5/2000 | Jones et al. | |
| 6,148,349 A | 11/2000 | Chow | |

(Continued)

OTHER PUBLICATIONS

"SAS and S-ATA: Newest Storage Interface Technology Disclosure", Hardware, 2003, vol. 5, p. 42-45.
(Continued)

*Primary Examiner* — Ernest Unelus
(74) *Attorney, Agent, or Firm* — Winston Hsu

(57) ABSTRACT

A storage virtualization computer system. The storage virtualization computer system comprises a host entity for issuing an IO request, a storage virtualization controller coupled to the host entity for executing IO operations in response to the IO request, and a at least one physical storage device, each coupled to the storage virtualization controller through a point-to-point serial-signal interconnect, for providing storage to the storage virtualization computer system through the storage virtualization controller. As an example, the point-to-point serial-signal interconnect can be a Serial ATA IO device interconnect.

95 Claims, 20 Drawing Sheets

(56) References Cited

U.S. PATENT DOCUMENTS

| | | |
|---|---|---|
| 6,178,520 B1 | 1/2001 | DeKoning |
| 6,247,077 B1 | 6/2001 | Muller |
| 6,314,460 B1 | 11/2001 | Knight |
| 6,397,292 B1 * | 5/2002 | Venkatesh ........... G06F 11/2087 |
| | | 711/113 |
| 6,467,034 B1 | 10/2002 | Yanaka |
| 6,483,107 B1 | 11/2002 | Rabinovitz et al. |
| 6,493,772 B1 * | 12/2002 | Hughes ............... G06F 11/0727 |
| | | 710/15 |
| 6,516,370 B1 | 2/2003 | Mulvihill |
| 6,532,547 B1 | 3/2003 | Wilcox |
| 6,574,709 B1 | 6/2003 | Skazinski |
| 6,711,632 B1 | 3/2004 | Chow |
| 6,735,603 B2 | 5/2004 | Cabrera |
| 6,799,283 B1 * | 9/2004 | Tamai et al. .................. 714/6.12 |
| 6,845,428 B1 | 1/2005 | Kedem |
| 6,886,059 B2 | 4/2005 | Smith |
| 6,961,813 B2 | 11/2005 | Grieff et al. |
| 7,028,213 B2 * | 4/2006 | Majni et al. .................... 714/5.1 |
| 7,065,661 B2 | 6/2006 | Borsini et al. |
| 7,073,022 B2 | 7/2006 | El-Batal |
| 7,107,320 B2 | 9/2006 | Busser |
| 7,107,343 B2 | 9/2006 | Rinaldis |
| 7,111,194 B1 | 9/2006 | Schoenthal |
| 7,124,265 B2 | 10/2006 | Nagasoe |
| 7,146,521 B1 | 12/2006 | Nguyen |
| 7,246,192 B1 | 7/2007 | Chang |
| 7,620,790 B1 | 11/2009 | Blumenau |
| 7,681,061 B2 * | 3/2010 | Suzuki et al. ................. 713/340 |
| 2002/0133735 A1 | 9/2002 | McKean |
| 2002/0144044 A1 | 10/2002 | Moon |
| 2002/0152355 A1 * | 10/2002 | Otterness et al. ............. 711/114 |
| 2002/0188800 A1 * | 12/2002 | Tomaszewski et al. ...... 711/112 |
| 2003/0033477 A1 | 2/2003 | Johnson et al. |
| 2003/0061264 A1 | 3/2003 | Benhase |
| 2003/0097607 A1 * | 5/2003 | Bessire ............................ 714/5 |
| 2003/0101228 A1 | 5/2003 | Busser |
| 2003/0163757 A1 * | 8/2003 | Kang .................. G06F 11/1076 |
| | | 714/6.12 |
| 2003/0187847 A1 * | 10/2003 | Lubbers .............. G06F 11/2079 |
| 2003/0193776 A1 * | 10/2003 | Bicknell et al. .............. 361/685 |
| 2004/0010660 A1 * | 1/2004 | Konshak et al. ............. 711/114 |
| 2004/0083308 A1 | 4/2004 | Sebastian |
| 2004/0088482 A1 | 5/2004 | Tanzer |
| 2004/0117545 A1 | 6/2004 | Borsini |
| 2004/0123027 A1 | 6/2004 | Workman |
| 2004/0177218 A1 * | 9/2004 | Meehan et al. ............... 711/114 |
| 2004/0193791 A1 | 9/2004 | Felton |
| 2004/0210584 A1 | 10/2004 | Nir et al. |
| 2004/0260873 A1 | 12/2004 | Watanabe |
| 2005/0005044 A1 | 1/2005 | Liu et al. |
| 2005/0089027 A1 | 4/2005 | Colton |
| 2005/0114573 A1 | 5/2005 | Chen |
| 2005/0120170 A1 | 6/2005 | Zhu |
| 2005/0143694 A1 | 6/2005 | Schmidt et al. |
| 2005/0160319 A1 | 7/2005 | Marcak et al. |
| 2005/0182887 A1 | 8/2005 | Sakurai |
| 2005/0204078 A1 | 9/2005 | Steinmetz et al. |
| 2005/0223269 A1 | 10/2005 | Stolowitz |
| 2005/0251588 A1 | 11/2005 | Hoch |
| 2005/0268079 A1 | 12/2005 | Rothman |
| 2006/0129761 A1 | 6/2006 | Guha |
| 2006/0150001 A1 | 7/2006 | Eguchi |
| 2006/0206494 A1 * | 9/2006 | Ibrahim et al. ................. 707/10 |
| 2007/0220316 A1 * | 9/2007 | Guha et al. ....................... 714/6 |

OTHER PUBLICATIONS

Jone et al., "An efficient BIST method for distributed small buffers" (abstract only), Publication Date: Aug. 2002, IEEE Xplore.

* cited by examiner

| | | | | | | |
|---|---|---|---|---|---|---|
| Reserved (0) | Reserved (0) \| R \| I \| D \| Reserved (0) \| FIS Type (41h) | DMA buffer identifier low | DMA buffer identifier high | Reserved (0) | DMA buffer offset | DMA transfer count | Reserved (0) |
| 0 | 1 | 2 | 3 | 4 | 5 | 6 |

FIG. 11

STORAGE VIRTUALIZATION COMPUTER SYSTEM AND EXTERNAL CONTROLLER THEREFOR

CROSS REFERENCE TO RELATED APPLICATIONS

This application is a continuation application of U.S. patent application Ser. No. 10/707,871, filed on Jan. 20, 2004, which claims the benefit of provisional Application No. 60/483,926, filed on Jul. 2, 2003, the entirety of which are incorporated by reference herein.

BACKGROUND OF THE INVENTION

1. Field of the Invention

The invention relates to a storage virtualization computer system. More particularly, a storage virtualization computer system that uses point-to-point serial-signal interconnect as the primary device-side IO device interconnect is disclosed.

2. Description of the Prior Art

Storage virtualization is a technology that has been used to virtualize physical storage by combining sections of physical storage devices (PSDs) into logical storage entities, herein referred to as logical media units (LMUs), that are made accessible to a host system. This technology has been used primarily in redundant arrays of independent disks (RAID) storage virtualization, which combines smaller physical storage devices into larger, fault tolerant, higher performance logical media units via RAID technology.

A Storage virtualization Controller, abbreviated SVC, is a device the primary purpose of which is to map combinations of sections of physical storage media to logical media units visible to a host system. IO requests received from the host system are parsed and interpreted and associated operations and data are translated into physical storage device IO requests. This process may be indirect with operations cached, delayed (e.g., write-back), anticipated (read-ahead), grouped, etc. to improve performance and other operational characteristics so that a host IO request may not necessarily result directly in physical storage device IO requests in a one-to-one fashion.

An External (sometimes referred to as "Stand-alone") Storage Virtualization Controller is a Storage Virtualization Controller that connects to the host system via an IO interface and that is capable of supporting connection to devices that reside external to the host system and, in general, operates independently of the host.

One example of an external Storage Virtualization Controller is an external, or stand-alone, direct-access RAID controller. A RAID controller combines sections on one or multiple physical direct access storage devices (DASDs), the combination of which is determined by the nature of a particular RAID level, to form logical media units that are contiguously addressable by a host system to which the logical media unit is made available. A single RAID controller will typically support multiple RAID levels so that different logical media units may consist of sections of DASDs combined indifferent ways by virtue of the different RAID levels that characterize the different units.

Another example of an external Storage Virtualization Controller is a JBOD emulation controller. A JBOD, short for "Just a Bunch of Drives", is a set of physical DASDs that connect directly to a host system via one or more a multiple-device IO device interconnect channels. DASDs that implement point-to-point IO device interconnects to connect to the host system (e.g., Parallel ATA HDDs, Serial ATA HDDs, etc.) cannot be directly combined to form a "JBOD" system as defined above for they do not allow the connection of multiple devices directly to the IO device channel. An intelligent "JBOD emulation" device can be used to emulate multiple multiple-device IO device interconnect DASDs by mapping IO requests to physical DASDs that connect to the JBOD emulation device individually via the point-to-point IO-device interconnection channels.

Another example of an external Storage Virtualization Controller is a controller for an external tape backup subsystem.

The primary function of a storage virtualization controller, abbreviated as SVC, is to manage, combine, and manipulate physical storage devices in such a way as to present them as a set of logical media units to the host. Each LMU is presented to the host as if it were a directly-connected physical storage device (PSD) of which the LMU is supposed to be the logical equivalent. In order to accomplish this, IO requests sent out by the host to be processed by the SVC that will normally generate certain behavior in an equivalent PSD also generate logically equivalent behavior on the part of the SVC in relation to the addressed logical media unit. The result is that the host "thinks" it is directly connected to and communicating with a PSD when in actuality the host is connected to a SVC that is simply emulating the behavior of the PSD of which the addressed logical media unit is the logical equivalent.

In order to achieve this behavioral emulation, the SVC maps IO requests received from the host to logically equivalent internal operations. Some of these operations can be completed without the need to directly generate any device-side IO requests to device-side PSDs. Among these are operations that are processed internally only, without ever the need to access the device-side PSDs. The operations that are initiated as a result of such IO requests will herein be termed "internally-emulated operations".

There are operations that cannot be performed simply through internal emulation and yet may not directly result in device-side PSD accesses. Examples of such include cached operations, such as data read operations in which valid data corresponding to the media section addressed by the IO request currently happens to reside entirely in the SVC's data cache, or data write operations when the SVC's cache is operating in write-back mode so that data is written into the cache only at first, to be committed to the appropriate PSDs at a future time. Such operations will be referred to as "asynchronous device operations" (meaning that any actual IO requests to device-side PSDs that must transpire in order for the requested operation to achieve its intended goal are indirectly performed either prior or subsequent to the operation rather than directly in response to the operation).

Yet another class of operations consists of those that directly generate device-side IO requests to PSDs in order to complete. Such operations will be referred to as "synchronous device operations".

Some host-side IO requests may map an operation that may consist of multiple sub-operations of different classes, including internally-emulated, asynchronous device and/or synchronous device operations. An example of a host-side IO request that maps to a combination of asynchronous and synchronous device operations is a data read request that addresses a section of media in the logical media unit part of whose corresponding data currently resides in cache and part of whose data does not reside in cache and therefore must be read from the PSDs. The sub-operation that takes data from the cache is an asynchronous one because the sub-operation does not directly require device-side PSD accesses to complete, however, does indirectly rely on results of previously-executed device-side PSD accesses. The sub-operation that reads data from the PSDs is a synchronous one, for it requires direct and immediate device-side PSD accesses in order to complete.

Traditionally storage virtualization has been done with Parallel SCSI, Fibre, or Parallel ATA IO device interconnects as the primary device-side IO device interconnects connecting physical storage devices to the storage virtualization controller. Both Parallel SCSI and Fibre are multiple-device IO device interconnects. Multiple-device IO device interconnects share bandwidth among all hosts and all devices interconnected by the interconnects.

Please refer to FIG. 1, which is a block diagram of a conventional storage virtualization computer system using Parallel SCSI as the primary device-side IO device interconnect. With the Parallel SCSI device-side IO device interconnect, the total bandwidth is limited to 320 MB/s per interconnect, or 1280 MB/s accumulated bandwidth for an implementation like the one diagramed in FIG. 1 with 4 Parallel SCSI device-side interconnects. Please refer to FIG. 2, FIG. 2 is a block diagram of a conventional storage virtualization computer system using Fibre FC-AL as the primary device-side IO device interconnect. With the Fibre FC-AL device-side IO device interconnect, the total bandwidth is limited to 200 MB/s per interconnect, or 800 MB/s accumulated bandwidth for an implementation like the one diagramed in FIG. 2 with 4 Fibre device-side interconnects.

Multiple-device IO device interconnects, for example Parallel SCSI, suffer from the shortcoming that a single failing device connected on the interconnect could interfere with communications and/or data transfer between hosts and other devices sharing the interconnect. Fibre FC-AL implementations have alleviated this concern to a certain extent by providing dual redundant interconnects that provide two paths to each device should one path break or become blocked for some reason (e.g., interference from another failing device). However, this is still inferior to a dedicated interconnect per storage device, for independent failures on both interconnects could still result in disabling interference concurrently on both interconnects. Dedicated interconnects, on the other hand, insure full signal integrity independence between interconnects so that a failure on one will not affect another.

Another traditional storage virtualization has been done with Parallel ATA device-side IO device interconnects, which is a point-to-point IO device interconnect using parallel signal transmission. By using point-to-point interconnects with each physical storage device having its own dedicated interconnect connecting it to the hosts, each particular physical storage device is afforded guaranteed, dedicated bandwidth such that N physical storage devices can achieve N times the bandwidth of a single interconnect.

Parallel ATA, however, suffers from the drawback that device-side IO device interconnects at most, only protect the payload data portion of information and not the control information (e.g., block address, data length, etc). In addition, Parallel ATA interconnects do not scale well beyond a certain point because of the number of dedicated signal lines (28) that must be used to form each distinct interconnect. Moreover, P-ATA, because of its parallel nature, will not be able to easily support higher interface speeds.

SUMMARY OF THE INVENTION

It is therefore a primary objective of the claimed invention to provide a storage virtualization computer system using point-to-point serial-signal transmissions as the primary device-side IO device interconnects to solve the above-mentioned problems.

According to the claimed invention, a storage virtualization computer system is introduced. The storage virtualization computer system comprises a host entity for issuing an IO request, an external storage virtualization controller coupled to the host entity for executing IO operations in response to the IO request, and at least one physical storage device each coupled to the storage virtualization controller through a point-to-point serial-signal interconnect for providing storage to the storage virtualization computer system through the storage virtualization controller. In one embodiment, the point-to-point serial-signal interconnect is a Serial ATA IO device interconnect.

It is an advantage of the claimed invention that in the storage virtualization computer system using Serial ATA as the primary device-side IO device interconnect, each physical storage device has a dedicated interconnect to the storage virtualization controller.

It is another advantage of the claimed invention that not only the payload data portion of information but also the control information are protected by the S-ATA IO device interconnect.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 11 illustrates a first FIS data structure complying with serial ATA protocol.

DETAILED DESCRIPTION

Figure 1:
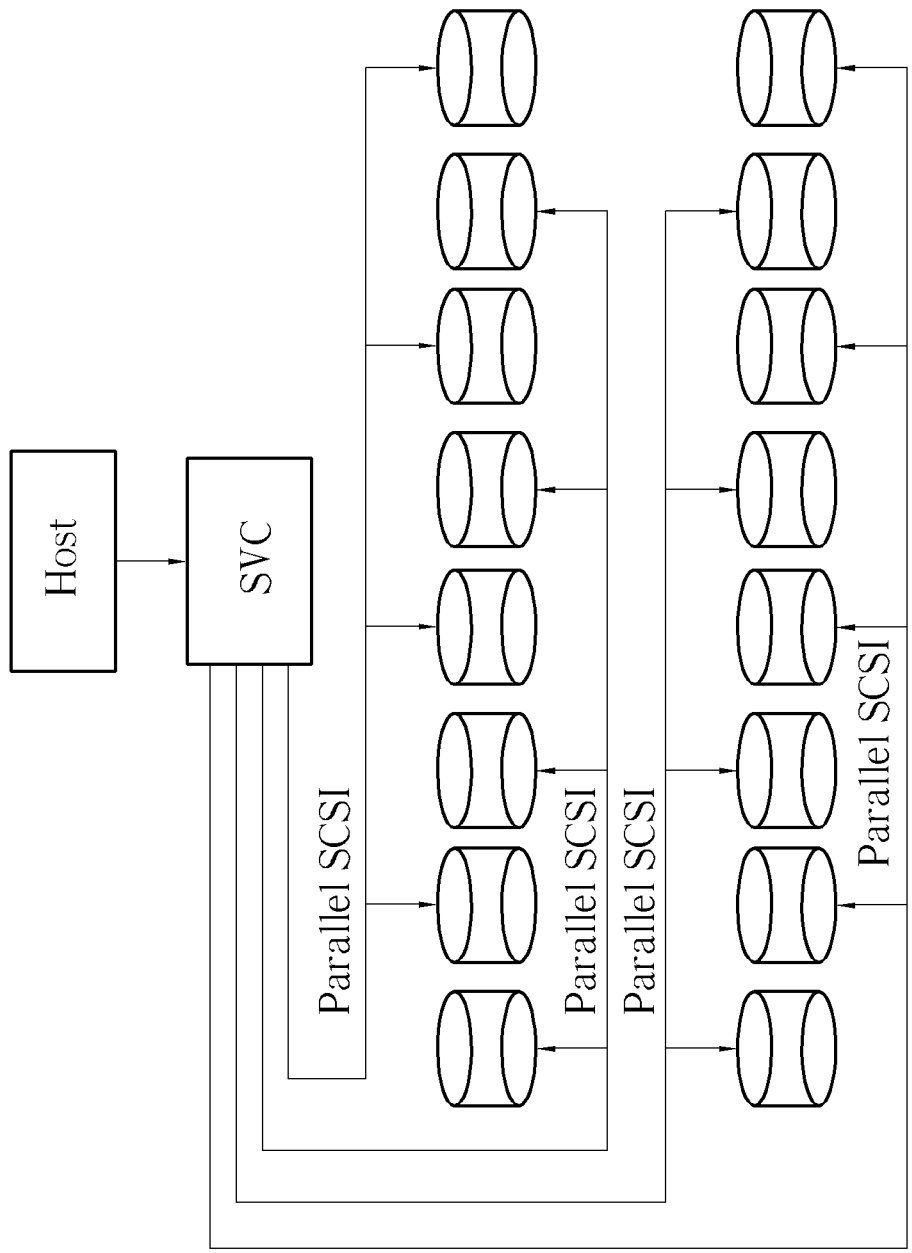
FIG. 1 is a block diagram of a conventional storage virtualization computer system using Parallel SCSI as the primary device-side IO device interconnect.
Figure 2:
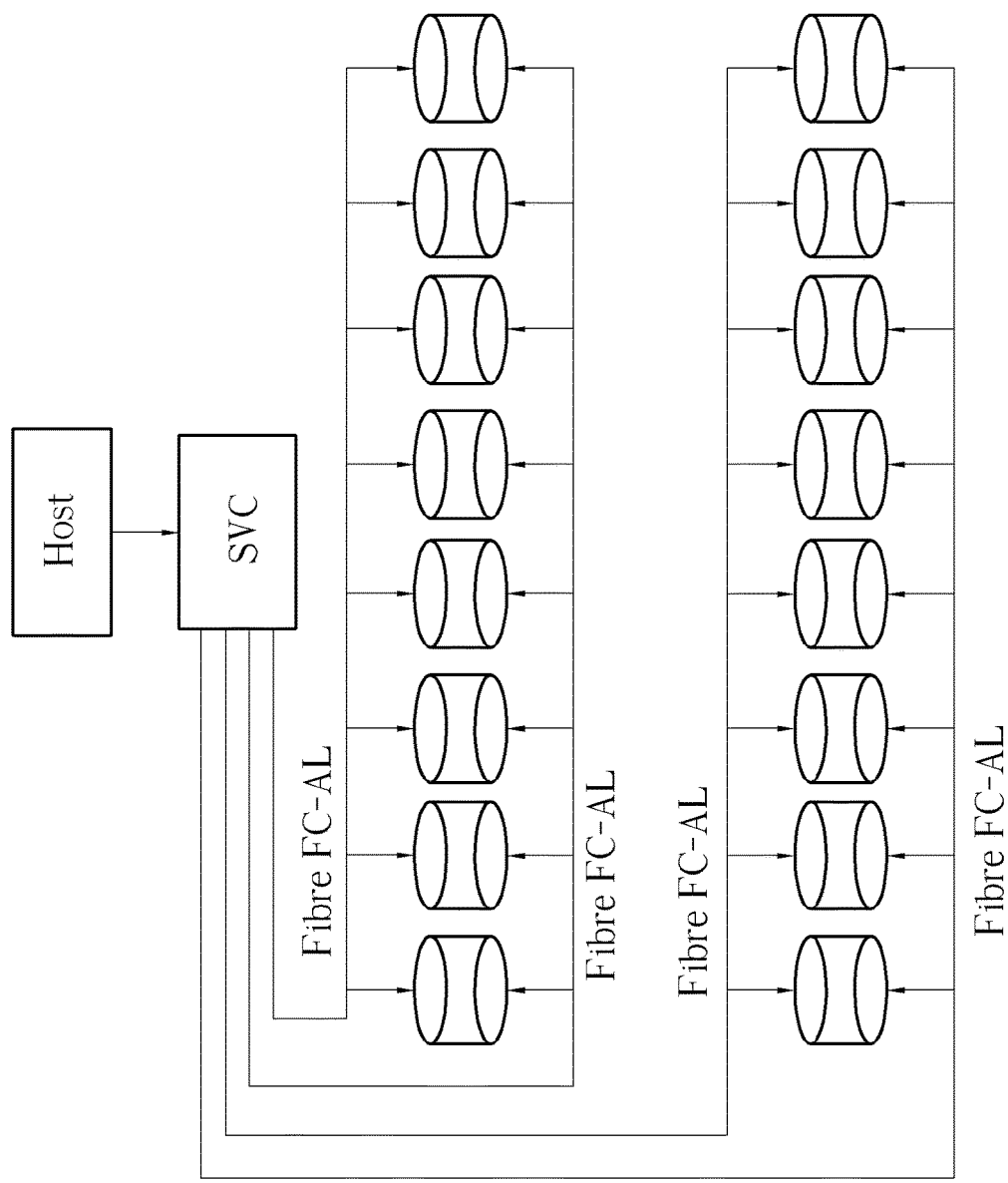
FIG. 2 is a block diagram of a conventional storage virtualization computer system using Fibre FC-AL as the primary device-side IO device interconnect.
Figure 3:
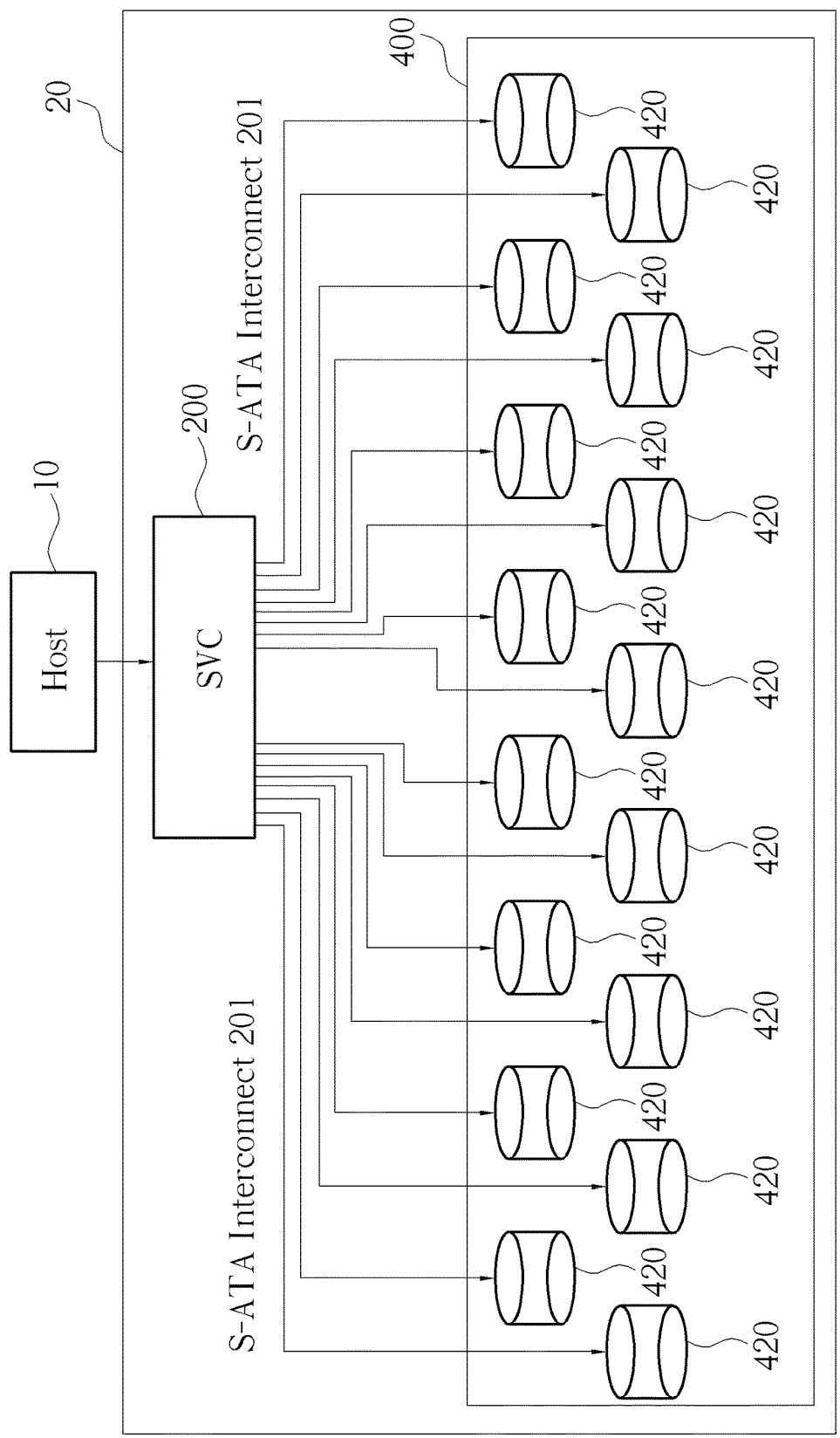
FIG. 3 is a block diagram of a storage virtualization computer system according to the present invention.

Please refer to FIG. 3, which is an embodiment block diagram of a storage virtualization computer system according to the present invention. In FIG. 3 Serial ATA is used as the primary device-side IO device interconnects. The computer system comprises a host entity IO and a connected storage virtualization subsystem (SVS) 20. Although there is illustrated in FIG. 3 only one host entity 10 connected with one SVS 20, there can be more than one SVS 20 attached to the host entity 10 or more than one host entity 10 can be attached to the SVS 20 or both.

The host entity 10 can be a host computer, such as a server system, a workstation, a PC system, or the like. The SVS 20 comprises a storage virtualization controller 200, which can be a RAID controller or a JBOD emulator, and a physical storage device array (PSD array) 400 connected by Serial ATA interconnect 201. Although only one PSD array 400 is illustrated here, more then one PSD array 400 can be attached to the SVC 200. Also, the host entity 10 can be attached to another SVC.

The SVC 200 receives IO requests and related data (the control signals and data signals) from the host entity 10 and executes the requests internally or maps the IO requests to the PSD array 400. The PSD array 400 comprises a plurality of physical storage devices 420, which can be hard disk drives (HDD), for example. The SVC 200 can be used to enhance performance and/or improve data availability and/or increase storage capacity of a single logical media unit in view of the host entity 10.

When a logical media unit in the SVS 20 is set to use a RAID level other than levels 0 or 1, for example, levels 3 through 5, the PSD array 400 comprises at least one parity PSD, that is, a PSD 420 which comprises parity data therein, and data availability can thus be improved. In addition, the performance can be improved in execution of an IO operation, since the accessed data is distributed among more than one PSD 420. Moreover, since the logical media unit is a combination of sections of a plurality of PSDs 420, the accessible storage capacity in a single logical media unit can be largely increased. For example, in a RAID subsystem of RAID level 5, the functionality described above can all be achieved.

When a logical media unit in the SVS 20 is set to use a RAID level 1, the same data will be stored in two PSDs 420, and thus data availability can be greatly enhanced at the cost of doubling the PSD 420 cost.

When a logical media unit in the SVS 20 is set to use a RAID level 0, performance improvement prevails over the availability concerns and thus no enhancement of data availability is provided. Performance, however, can be greatly improved. For example, a RAID subsystem of RAID level 0 having 2 hard disk drives can have, theoretically, a performance of 200% of a storage device having only one hard disk drive, since different data sections can be stored into the two separate hard disk drives at the same time under the control of the SVC 200.

Figure 4:
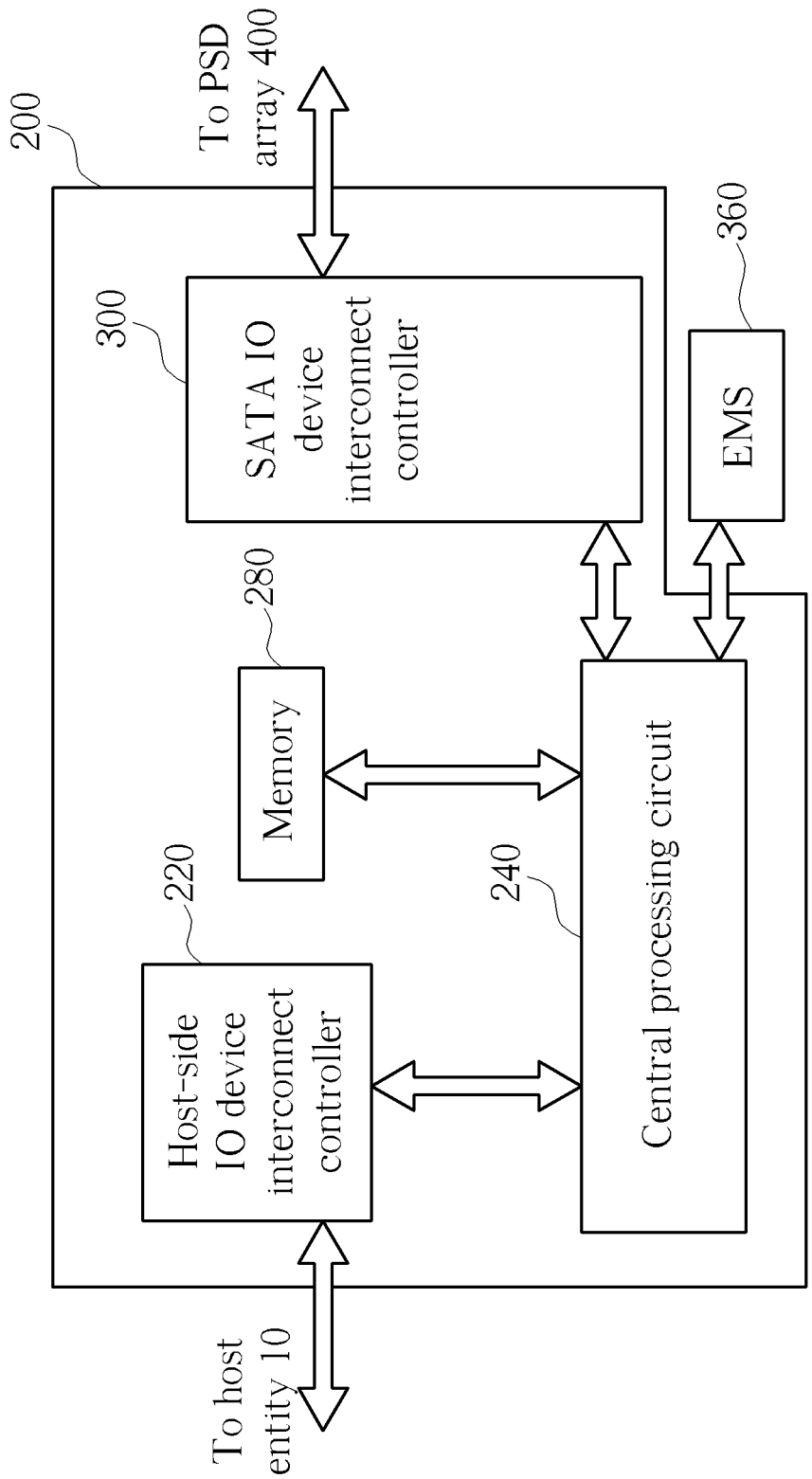
FIG. 4 is an embodiment block diagram of the SVC and the connection thereof to the host entity and the PSD array in FIG. 3.

Please refer to FIG. 4, which is an embodiment block diagram of the SVC 200 and the connection thereof to the host entity 10 and the PSD array 400. In this embodiment, the SVC 200 comprises a host-side IO device interconnect controller 220, a central processing circuit (abbreviated CPC) 240, a memory 280, and a Serial ATA (S-ATA) IO device interconnect controller 300. Although illustrated in separate functional blocks, two or more or even all of these functional blocks can be incorporated into to one chip in practical implementation.

The host-side IO device interconnect controller 220 is connected to the host entity 10 and the CPC 240 to serve as an interface and buffer between the SVC 200 and the host entity 10, and receives IO requests and related data from the host entity 10 and map and/or transfer them to the CPC 240. The host-side IO device interconnect controller 220 comprises one or more host-side ports for coupling to the host entity 10. Some common port types that might be incorporated here are: Fibre Channel supporting Fabric, point-to-point, public loop and/or private loop connectivity in target mode, parallel SCSI operating in target mode, ethernet supporting the iSCSI protocol operating in target mode, Serial-Attached SCSI (SAS) operating in target mode, and Serial ATA operating in target mode.

When the CPC 240 receives the IO requests of the host entity 10 from the host-side IO device interconnect controller 220, the CPC 240 parses it and performs some operations in response to the IO requests and sends the data requested and/or reports and/or information from the SVC 200 back to the host entity 10 through the host-side IO device interconnect controller 220.

After parsing an IO request received from the host entity 10, when a read request is received and one or more operations are performed in response, the CPC 240 gets the requested data either internally or from the memory 280 or in both ways and transfers them to the host entity 10. If the data is not available either internally or does not exist in the memory 280, the IO request will be issued to the PSD array 400 through the SATA IO device interconnect controller 300 and the requested data will be transferred from the PSD array 400 to the memory 280 and then passed to the host entity 10 through host-side IO device interconnect controller 220.

When a write request is received from the host entity 10, after parsing the request and performing one or more operations, the CPC 240 gets the data from the host entity 10 through the host-side IO device interconnect controller 220, stores them in the memory 280 and then, for asynchronous or synchronous device operations, transmits the data to the PSD array 400 through the CPC 240. When the write request is a write back request, the IO complete report can be issued to the host entity 10 first and then the CPC 240 performs the actual write operation later. When the write request is a write through request, the IO complete report is issued to the host entity 10 after the requested data is actually written into the PSD array 400.

The memory 280 is connected to the CPC 240 and acts as a buffer to buffer the data transferred between the host entity 10 and the PSD array 400 through the CPC 240. In one embodiment, the memory 280 can be a DRAM; or more particularly, the DRAM can be a SDRAM.

The SATA IO device interconnect controller 300 is the device-side IO device interconnect controller connected between the CPC 240 and the PSD array 400. It serves as an interface and buffer between the SVC 200 and the PSD array 400 and receives IO requests and related data issued from CPC 240 and maps and/or transfers them to the PSD array 400. The SATA IO device interconnect controller 300 re-formats the data and control signals received from CPC 240 to comply with S-ATA protocol and transmits them to the PSD array 400.

In this embodiment, an enclosure management service (EMS) circuitry 360 is attached to the CPC 240 for managing and monitoring at least one of the following devices belonging to the storage virtualization subsystem 20: power supplies, fans, temperature sensors, voltages, uninterruptible power supplies, batteries, LEDs, audible alarms, PSD canister locks, door locks. However, in another arrangement of the SVS 20, the EMS circuitry 360 can be omitted, depending on the actual requirements of the various product functionality. Alternatively, the function of the EMS circuitry 360 can be incorporated into the CPC 240. Aspects of the EMS will be discussed later.

Figure 5:
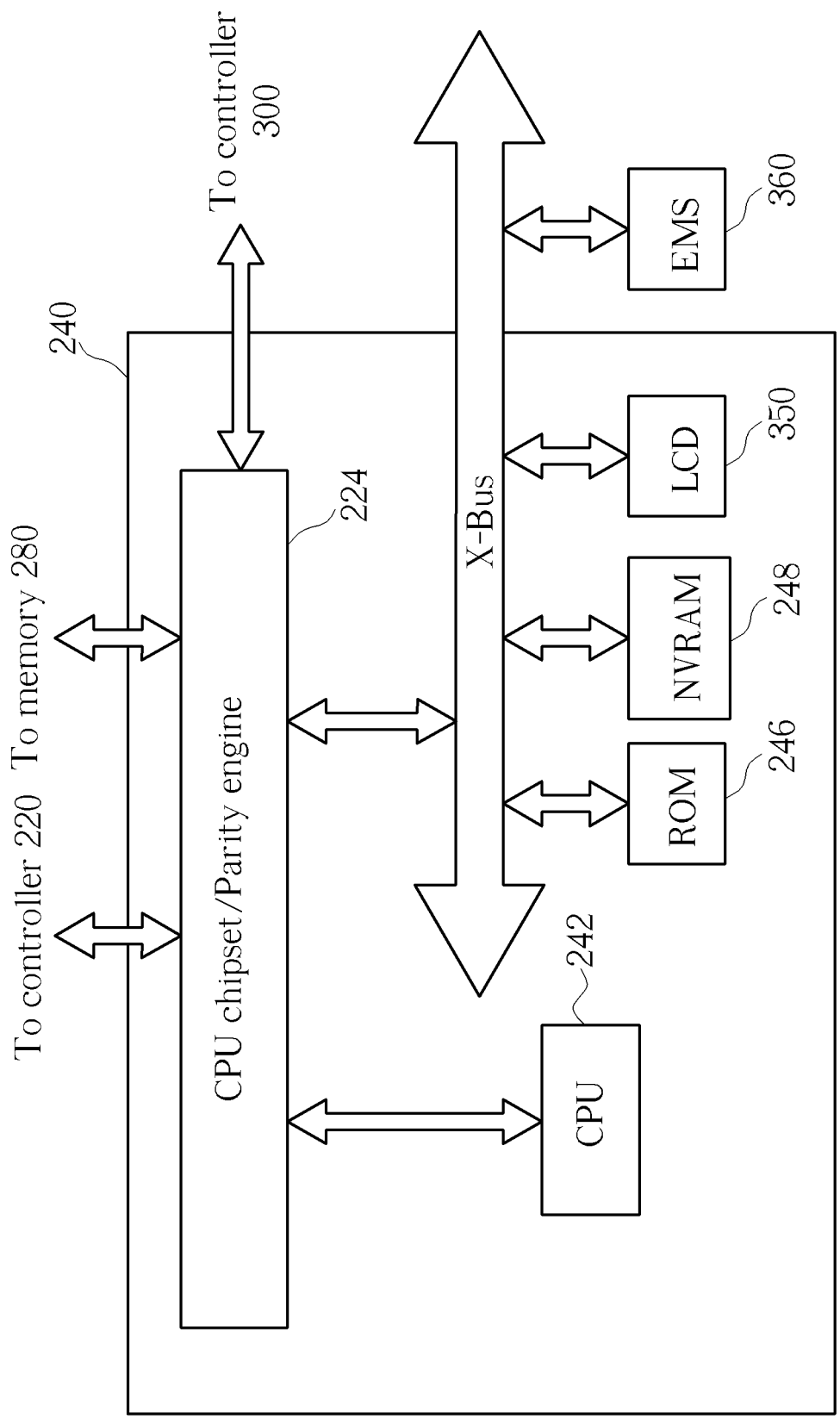
FIG. 5 is an embodiment block diagram of the CPC in FIG. 4.

In FIG. 5, an embodiment of the CPC 240 is shown, comprising the CPU chipset/parity engine 244, the CPU 242, a ROM (Read Only Memory) 246, a NVRAM (Non-volatile RAM) 248, an LCD module 350 and an enclosure management service circuitry EMS 360. The CPU can be, e.g., a Power PC CPU. The ROM 246 can be a FLASH memory for storing BIOS and/or other programs. The NVRAM is provided for saving some information regarding the IO operation execution status of the array which can be examined after an abnormal power shut-off occurs in the event that IO operation execution does not complete. LCD module 350 shows the operation of the subsystem LCDs. EMS 360 can control the power of the DASD array and do some other management. The ROM 246, the NVRAM 248, the LCD module 350 and the enclosure management service circuitry EMS 360 are connected to the CPU chipset/parity engine 244 through an X-bus.

Figure 6:
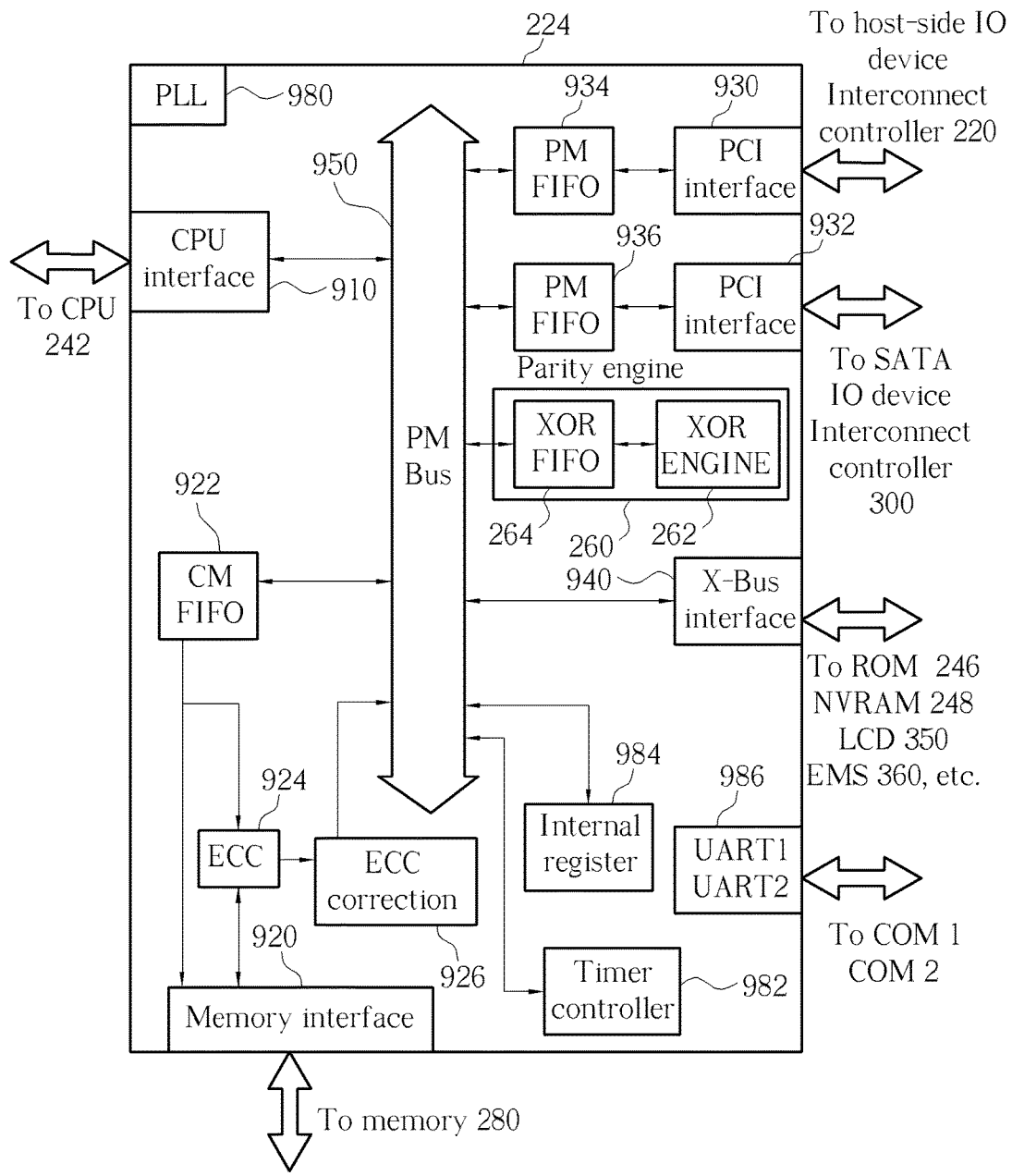
FIG. 6 is an embodiment block diagram of the CPU chipset/parity engine in FIG. 5.

FIG. 6 is a block diagram illustrating an embodiment of the CPU chipset/parity engine 244 according to the present invention. In the present embodiment, the CPU chipset/parity engine 244 mainly comprises parity engine 260, CPU interface 910, memory interface 920, PCI interfaces 930, 932, X-BUS interface 940, and PM BUS 950. The PM BUS 950 is, for example, a 64-bit, 133 Mhz bus and connects the parity engine 260, CPU interface 910, memory interface 920, PCI interfaces 930, 932, X-BUS interface 940 altogether for communicating data signal and control signal among them.

Data and control signals from host-side IO device interconnect controller 220 enter CPU chip/parity engine 244 through PCI interface 930 and are buffered in PM FIFO 934. The PCI interface 930 to the host-side IO device interconnect controller 220 can be, for example, of a bandwidth of 64-bit, 66 Mhz. When in the PCI slave cycle, the PCI interface 930 owns the PM bus 950 and the data and control signals in the PM FIFO 934 are then transmitted to either the memory interface 920 or to the CPU interface 910.

The data and control signals received by the CPU interface 910 from PM bus 950 are transmitted to CPU 242 for further treatment. The communication between the CPU interface 910 and the CPU 242 can be performed, for example, through a 64 bit data line and a 32 bit address line. The data and control signals can be transmitted to the memory interface 920 through a CM FIFO 922 of a bandwidth of 64 bit, 133 MHz.

An ECC (Error Correction Code) circuit 924 is also provided and connected between the CM FIFO 922 and the memory interface 920 to generate ECC code. The ECC code can be generated, for example, by XORing 8 bits of data for a bit of ECC code. The memory interface 920 then stores the data and ECC code to the memory 280, for example, an SDRAM. The data in the memory 280 is transmitted to PM bus 950 through the ECC correction circuit 926 and compared with the ECC code from the ECC circuit 924. The ECC correction circuit 926 has the functionality of one-bit auto-correcting and multi-bit error detecting.

The parity engine 260 can perform parity functionality of a certain RAID level in response to the instruction of the CPU 242. Of course, the parity engine 260 can be shut off and perform no parity functionality at all in some situation, for example, in a RAID level 0 case. In one embodiment as shown in the FIG. 6, the parity engine 260 can include an XOR engine 262 to connect with the PM bus 950 through XOR FIFO 264. The XOR engine 262 can perform, for example, the XOR function for a memory location with given address and length of the location.

The PLL (Phase Locked Loop) 980 is provided for maintaining desirable phase shifts between related signals. The timer controller 982 is provided as a timing base for various clocks and signals. The internal registers 984 are provided to register status of CPU chip/parity engine 244 and for controlling the traffic on the PM bus 950. In addition, a pair of UART functionality blocks 986 are provided so that CPU chip/parity engine 244 can communicate with outside through RS232 interface.

In an alternative embodiment, PCI-X interfaces can be used in place of the PCI interfaces 930, 932. Those skilled in the art will know such replacement can be easily accomplished without any difficulty. In an alternative embodiment, PCI Express interfaces can be used in place of the PCI interfaces 930, 932. Those skilled in the art will know such replacement can be easily accomplished without any difficulty.

Figure 7:
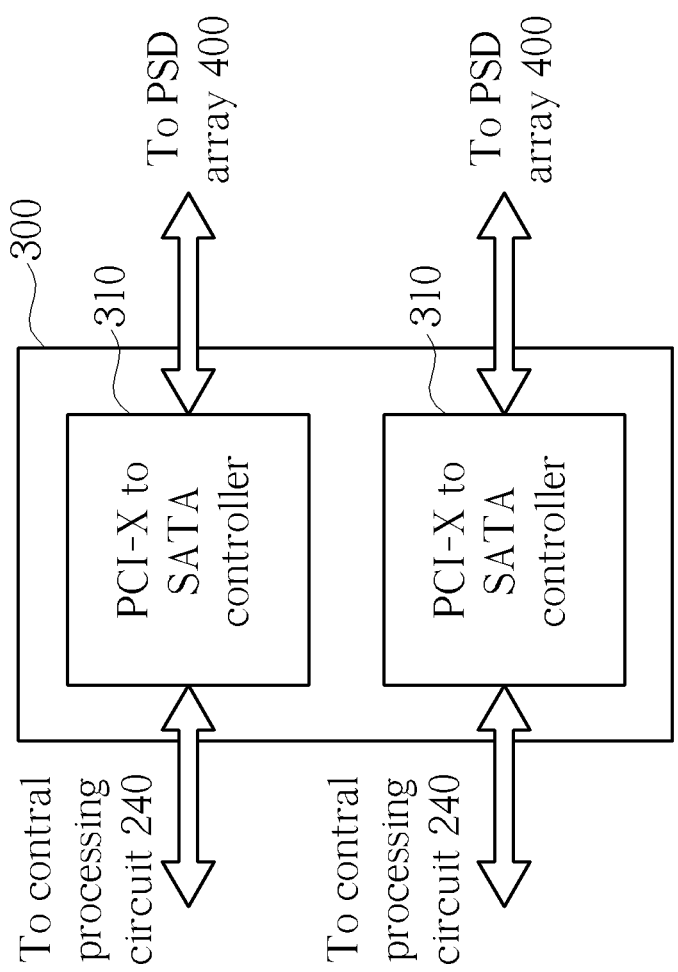
FIG. 7 is a block diagram of the SATA device interconnect controller of FIG. 4.
Figure 8:
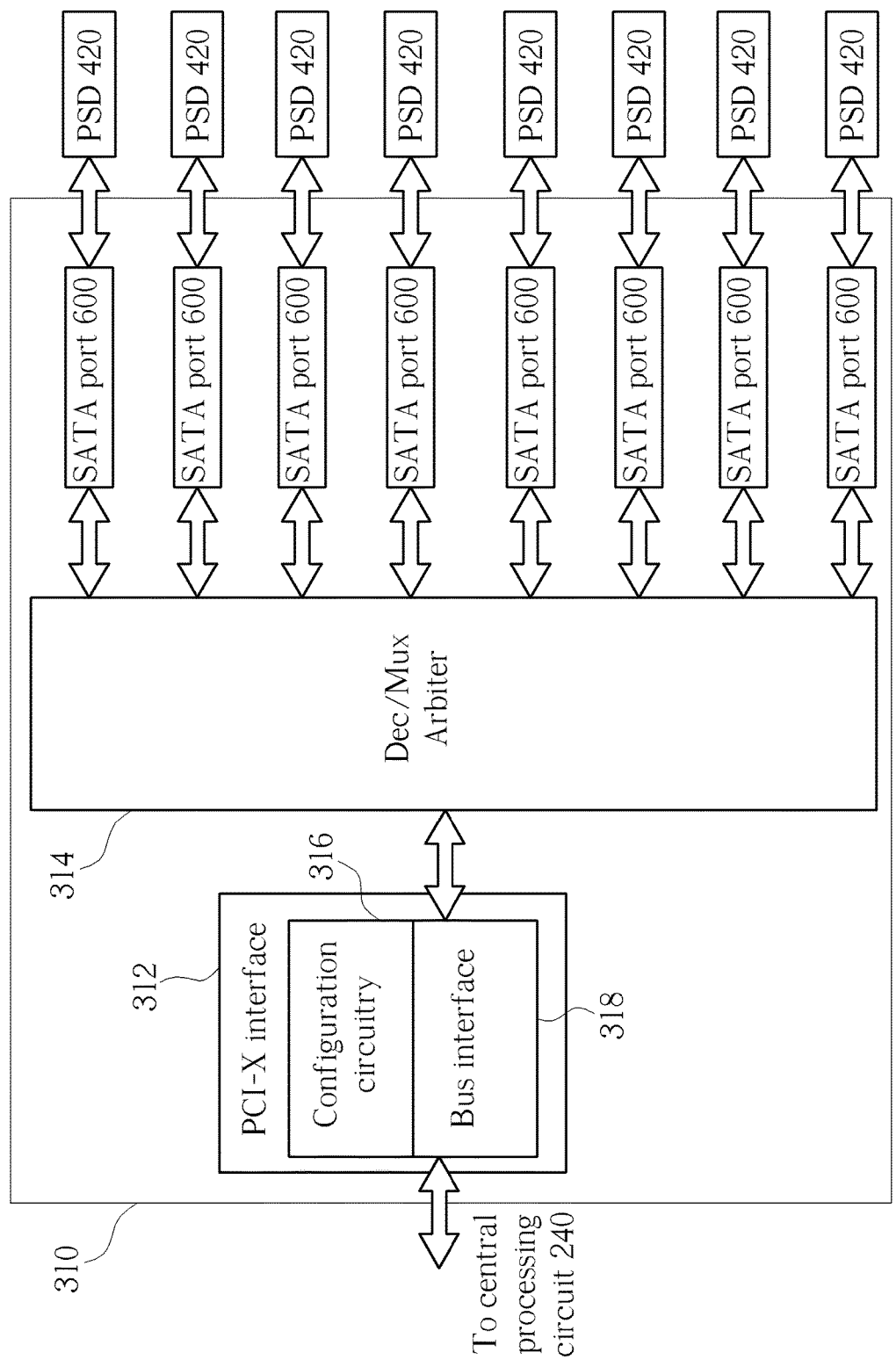
FIG. 8 is a block diagram of the PCI-X to ATA controller of FIG. 7.

Please refer to FIG. 7, which is an embodiment block diagram of the SATA IO device interconnect controller 300 of FIG. 4. According to the present embodiment, the SATA IO device interconnect controller 300 comprises two PCI-X to SATA controllers 310. FIG. 8 is an embodiment block diagram of the PCI-X to S-ATA controller 310 of FIG. 7. As shown in FIG. 8, each PCI-X to SATA controller 310 comprises a PCI-X Interface 312 connected to the CPC 240, a Dec/Mux Arbiter 314 connected to the PCI-X interface 312, and 8 SATA Ports 600 connected to the Dec/Mux Arbiter 314. The PCI-X interface 312 comprises a bus interface 318 connecting to the Dec/Mux arbiter 314 and a configuration circuitry 316 storing the configuration of the PCI-X to SATA controller 310. The Dec/Mux arbiter 314 performs arbitration between the PCI-X interface 312 and the plurality of SATA ports 600 and address decoding of the transactions from the PCI-X interface 312 to the SATA ports 600. Through an SATA port 600 of the PCI-X to SATA controller 310, the data and control signals are transmitted to a PSD 420. In an alternative embodiment, a PCI to SATA controller can be used in place of the PCI-X to SATA controller 310. In the PCI to SATA controller, a PCI interface 312' (not shown) is used in place of the PCI-X interface 312. Those skilled in the art will know such replacement can be easily accomplished without any difficulty. In an alternative embodiment, a PCI Express to SATA controller can be used in place of the PCI-X to SATA controller 310. In the PCI Express to SATA controller, a PCI Express interface is used in place of the PCI-X interface 312. Those skilled in the art will know such replacement can be easily accomplished without any difficulty.

Figure 9:
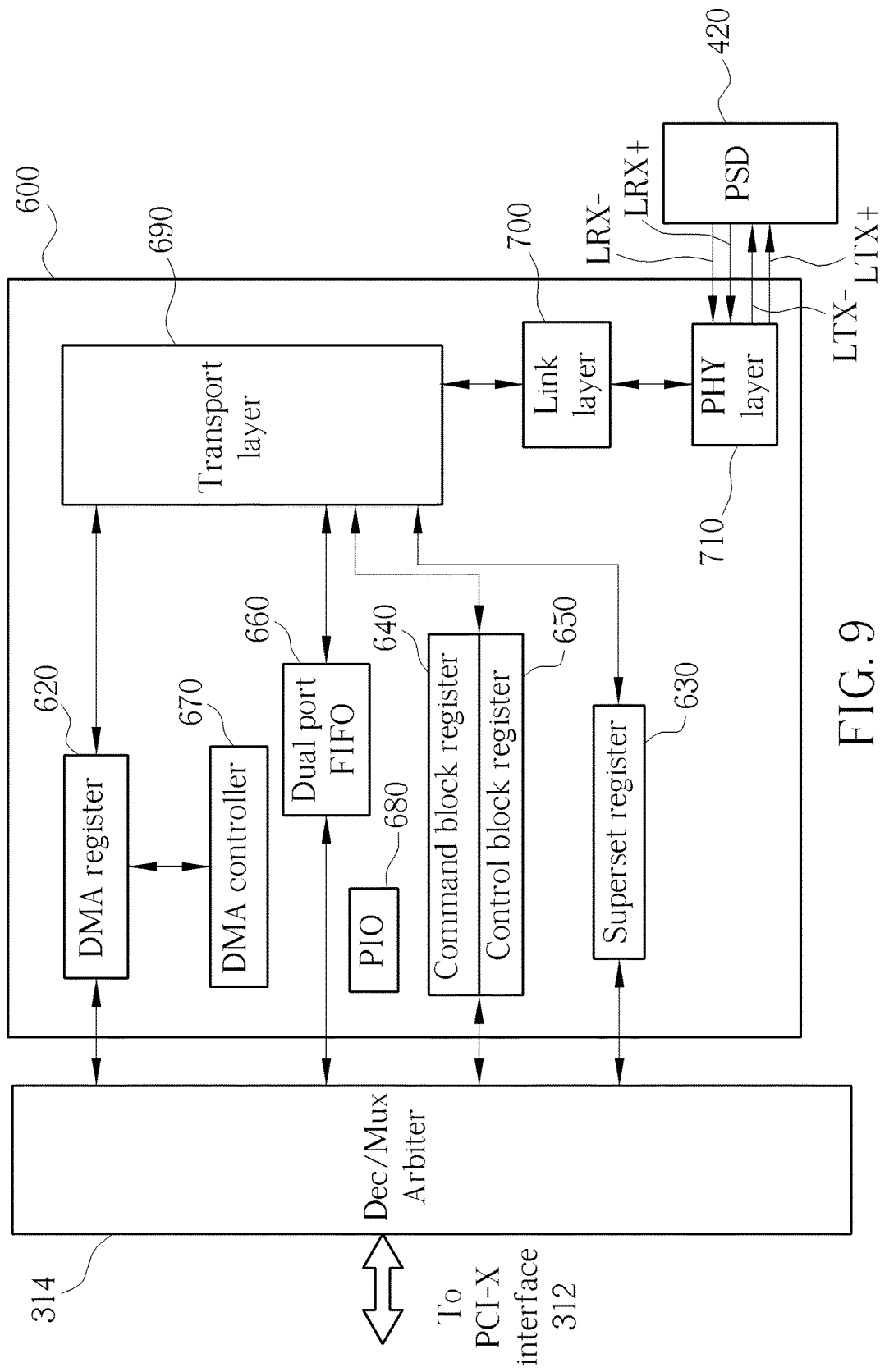
FIG. 9 is a block diagram of the SATA port of FIG. 8.

Next please refer to FIG. 9, FIG. 9 is a block diagram illustrating an embodiment of the SATA port 600 of FIG. 8. As shown in FIG. 9, the SATA port 600 comprises a superset register 630, a command block register 640, a control block register 650, and a DMA register 620. By filling these registers, data will be transferred between the Dec/Mux arbiter 314 and a transport layer 690 through a dual port FIFO 660 under the control of a DMA controller 670. The information received by the transport layer 690 will be re-formatted into a frame information structure (FIS) primitive and transmitted to a Link layer 700.

The Link layer 700 is then to re-format the FIS into a frame by adding SOF, CRC, EOF, etc., thereto and performing the 8b/10b encoding into encoded 8b/10b characters and transmits it to a PHY layer 710.

The PHY layer 710 will transmit signals through a pair of differential signal lines, transmission lines LTX+, LTX−, to and receive signals through another pair of differential signal lines, reception lines LRX+, LRX−, from a PSD controller in the PSD 420. The two signal lines of each pair of the signal lines, for example LTX+/LTX−, transmit signals TX+/TX−simultaneously at inverse voltage, for example, +V/−V or −V/+V, with respective to a reference voltage Vref so that the voltage difference will be +2v or −2V and thus enhance signal quality. This is also applicable to the transmission of the reception signals RX+/RX− on reception lines LRX+, LRX−.

When receiving a frame from the PHY layer 710, the Link layer 700 will decode the encoded 8b/10b characters and remove the SOF, CRC, EOF. A CRC will be calculated over the FIS to compare with the received CRC to ensure the correctness of the received information. When receiving the FIS from the Link layer 700, the transport layer 690 will determine the FIS type and distribute the FIS content to the locations indicated by the FIS type.

Figure 10:
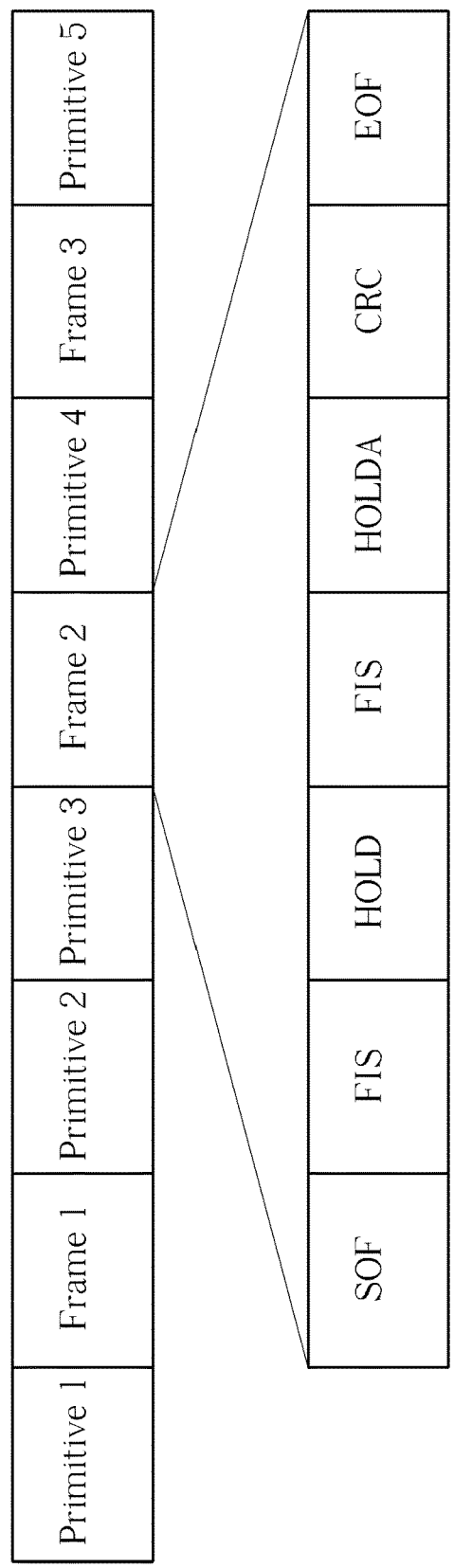
FIG. 10 illustrates the transmission structure complying with serial ATA protocol.

A transmission structure complying with serial ATA protocol is shown in FIG. 10. The information communicated on the serial line is a sequence of 8b/10b encoded characters. The smallest unit thereof is a double-word (32 bits). The contents of each double-word are grouped to provide low-level control information or to transfer information between a host and an device connected thereto. Two types of data structures transmitted on signal lines are primitives and frames.

A primitive consists of a single double-word and is the simplest unit of information that may be communicated between a host and a device. When the bytes in a primitive are encoded, the resulting pattern is not easy to be misinterpreted as another primitive or a random pattern. Primitives are used primarily to convey real-time state information, to control the transfer of information and to coordinate communication between the host and the device. The first byte of a primitive is a special character.

A frame consists of a plurality of double-words, and starts with an SOF (Start Of Frame) primitive and ends with an EOF (End Of Frame) primitive. The SOF is followed by a user payload called a FIS (Frame Information Structure). A CRC (Cyclic-Redundancy Check Code) is the last non-primitive double-word immediately proceeding the EOF primitive. The CRC is calculated over the contents of the FIS. Some other flow control primitives (HOLD or HOLDA) are allowed between the SOF and EOF to adjust data flow for the purpose of speed matching.

The transport layer constructs FIS's for transmission and decomposes FIS's received from the link layer. The transport layer does not maintain context of ATA commands or previous FIS content. As requested, the transport layer constructs an FIS by gathering FIS content and placing them in proper order. There are various types of FIS, two of which are shown in FIG. 11 and FIG. 12.

As shown in FIG. 11, a DMA setup FIS contains a HEADER in field 0. The first byte (byte 0) thereof defines the FIS type (41*h*), and the FIS type defines the rest fields of this FIS and defines the total length of this FIS as seven double-words. Bit D in byte 1 indicates the direction of the subsequent data transfer. D=1 means transmitter to receiver; D=0 means receiver to transmitter. Bit I in byte 1 is an interrupt bit. Bit R in byte 1 is a reserved bit and set to 0. DMA buffer identifier low/high field (field 1) indicates the DMA buffer region in the host memory. DMA buffer offset field (field 4) is the byte offset into the buffer. DMA transfer count field (field 5) is the number of bytes that will be read or written by the device.

Figure 12:
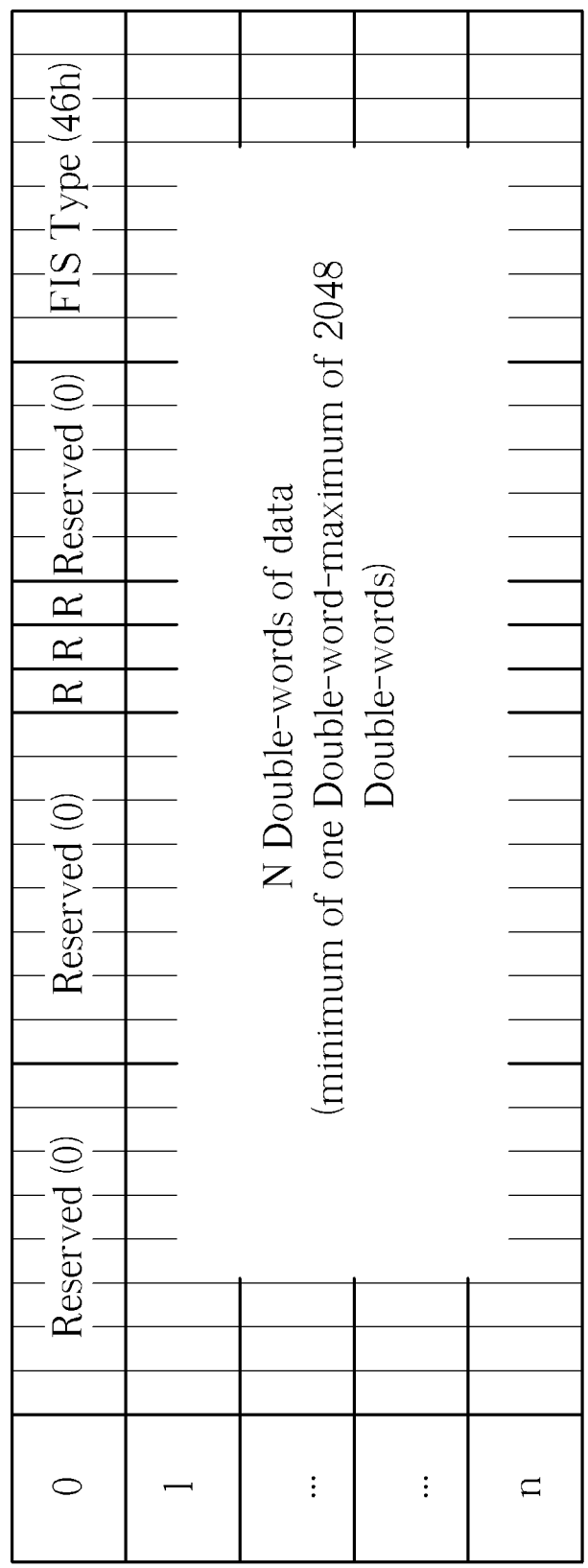
FIG. 12 illustrates a second FIS data structure complying with serial ATA protocol.

As shown in FIG. 12, a DATA FIS contains a HEADER in field 0. The first byte (byte 0) thereof defines the FIS type (46*h*), and the FIS type defines the rest fields of this FIS and defines the total length of this FIS as n+1 double-words. The R bits in byte 1 are reserved bits and set to 0. The fields 1 through n are double-words of data, which contain the data to transfer. The maximum amount of a single DATA FIS is limited.

In the embodiment of FIG. 4, the host-side IO device interconnect controller 220 and the device-side IO device interconnect controller 300 (SATA IO device interconnect controller 300) can be implemented with the same kind of IC chip, with IO device interconnect ports in the host-side IO device interconnect controller 220 configured as host-side IO device interconnect ports and with IO device interconnect ports in the device-side IO device interconnect controller 300 configured as device-side IO device interconnect ports. Alternately, a single chip could be configured to contain both host-side IO device interconnect ports and device-side IO device interconnect ports for, respectively, coupling to the host entity 10 and the PSD array 400 concurrently.

Figure 13:
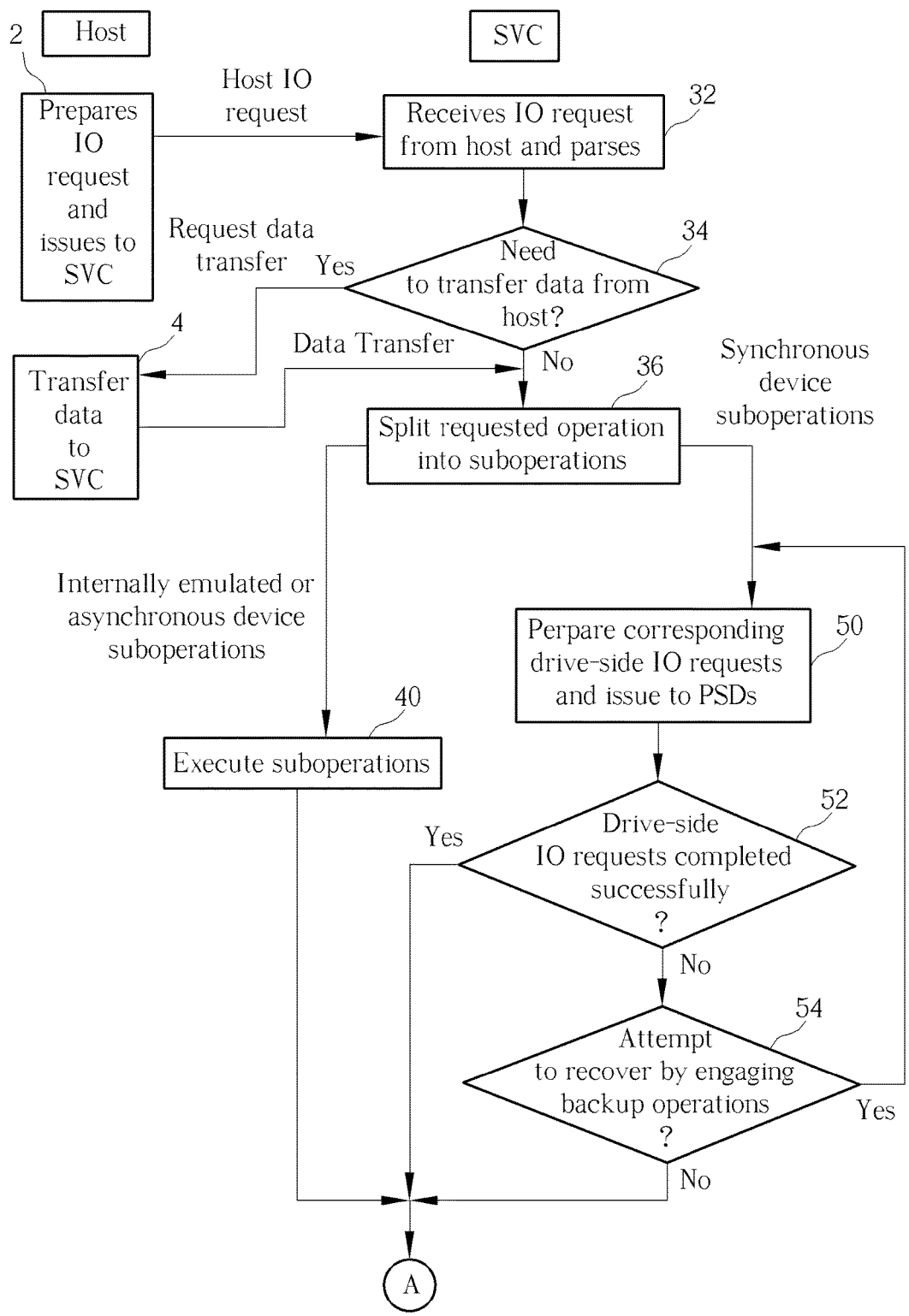
FIG. 13 and FIG. 14 are examples of the IO flow between the host entity and the SVC of FIG. 3.
Figure 14:
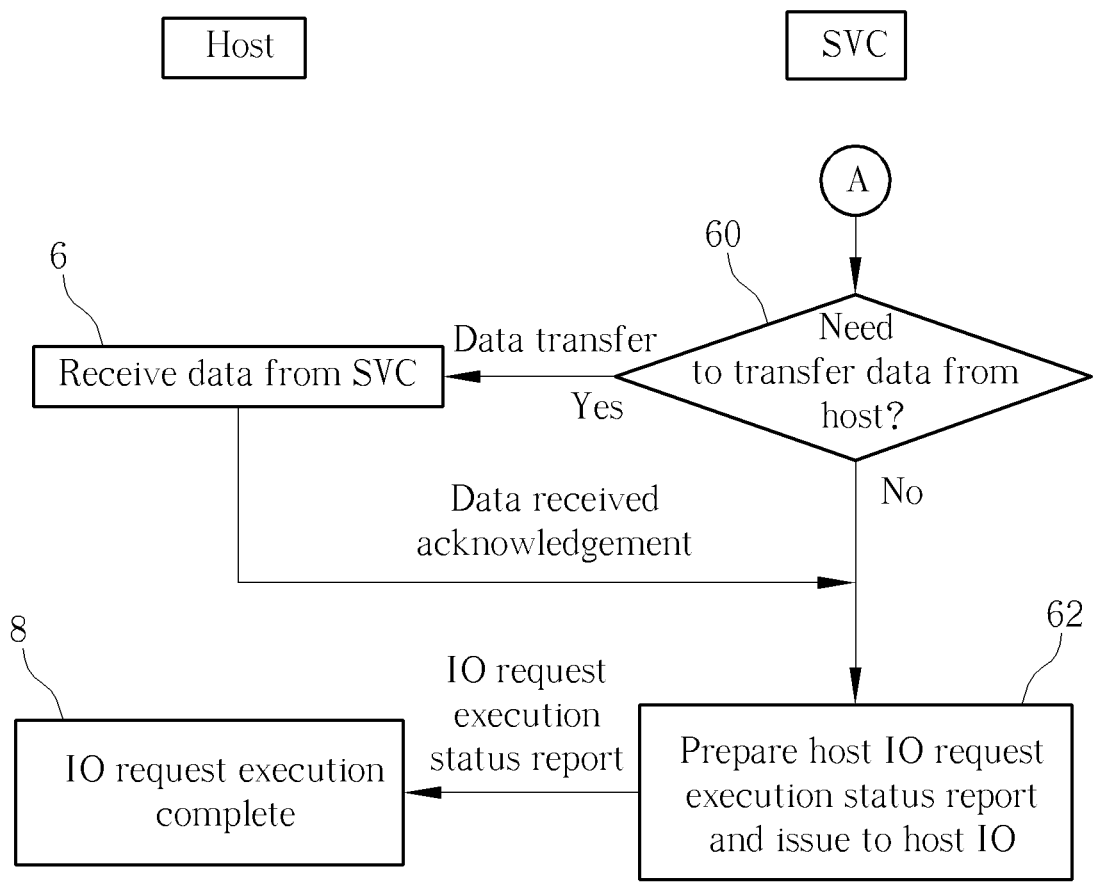

Next examples of the IO flow between the host entity 10 and the SVC 200 and the IO flow between the SVC 200 and the PSD array 400 will be introduced. Please refer to FIG. 13 and FIG. 14 where an example of the IO flow between the host entity 10 and the SVC 200 is illustrated. IO requests are received from the host entity 10 over one of the host-side IO device interconnects. The IO requests are parsed to determine what operation is to be performed and, for asynchronous device and synchronous device operations, on which section of the logical media unit the operation is to be performed. If the operation consists only of internally-emulated and asynchronous device sub-operations, then the SVC 200 executes the associated sub-operations including transferring any associated data to/from the host entity 10 and then responding to the host entity 10 with a status report that indicates whether the operation succeeded or failed and for what reason(s). If the operation includes synchronous device operations, then appropriate device-side IO requests are generated and issued to the appropriate PSDs 420 in response. The contents of each individual IO request and the distribution of the IO requests to different PSDs 420 is determined by the nature of the particular mapping that is associated with the particular LMU. Prior to or concurrently with the execution of device-side IO requests, any "payload" data that is to be obtained from the host entity 10 as part of the host-side IO request execution and then transferred to the PSD 420 is transferred from the host entity 10 to the SVC 200.

On successful completion of the device-side IO requests, data read in response to the device-side IO request is delivered to the entity requesting it, which, in a caching implementation, may be the cache and any data requested by the host is delivered to the host entity 10. A status report is then generated and transmitted to the host entity 10 indicating the success of the operation. If there were device-side IO requests that did not complete successfully, the SVC 200 may engage backup operations that allow successful completion of the sub-operation even in the face of individual device-side IO request failures. Such operations will typically include generating other device-side IO requests to different media sections to recover the data in the case of reads or to write backup data in the case of writes. RAID 5 is an example of where data on other PSDs 420 can be used to regenerate data that could not be read off from a particular PSD 420. Alternately, the SVC 200 could elect to fail the sub-operation aborting the delivery of data to the host entity 10 and returning a corresponding status report to the host entity 10.

Figure 15:
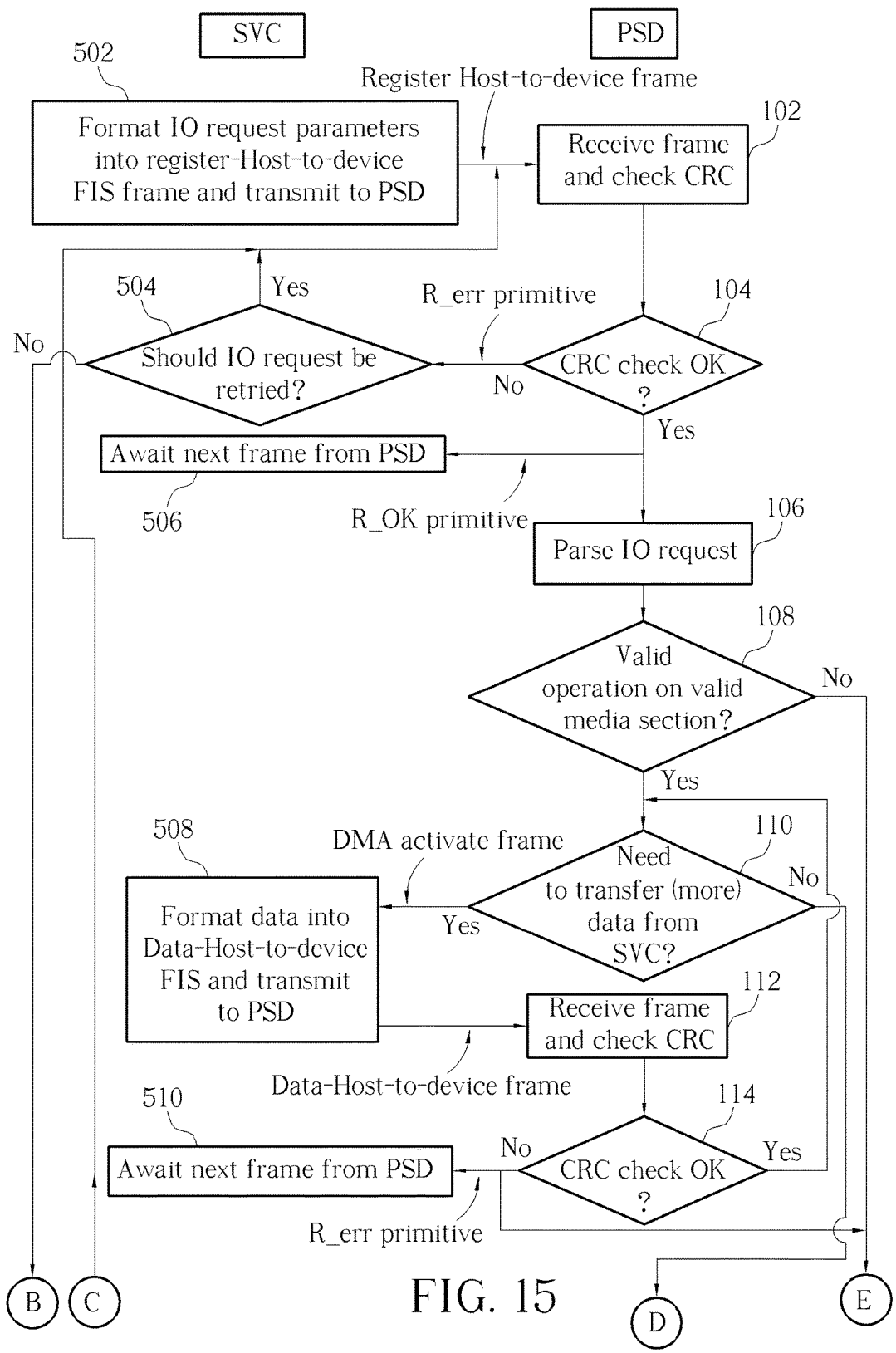
FIG. 15 and FIG. 16 are examples of the IO flow between the SVC and a PSD of FIG. 3.
Figure 16:
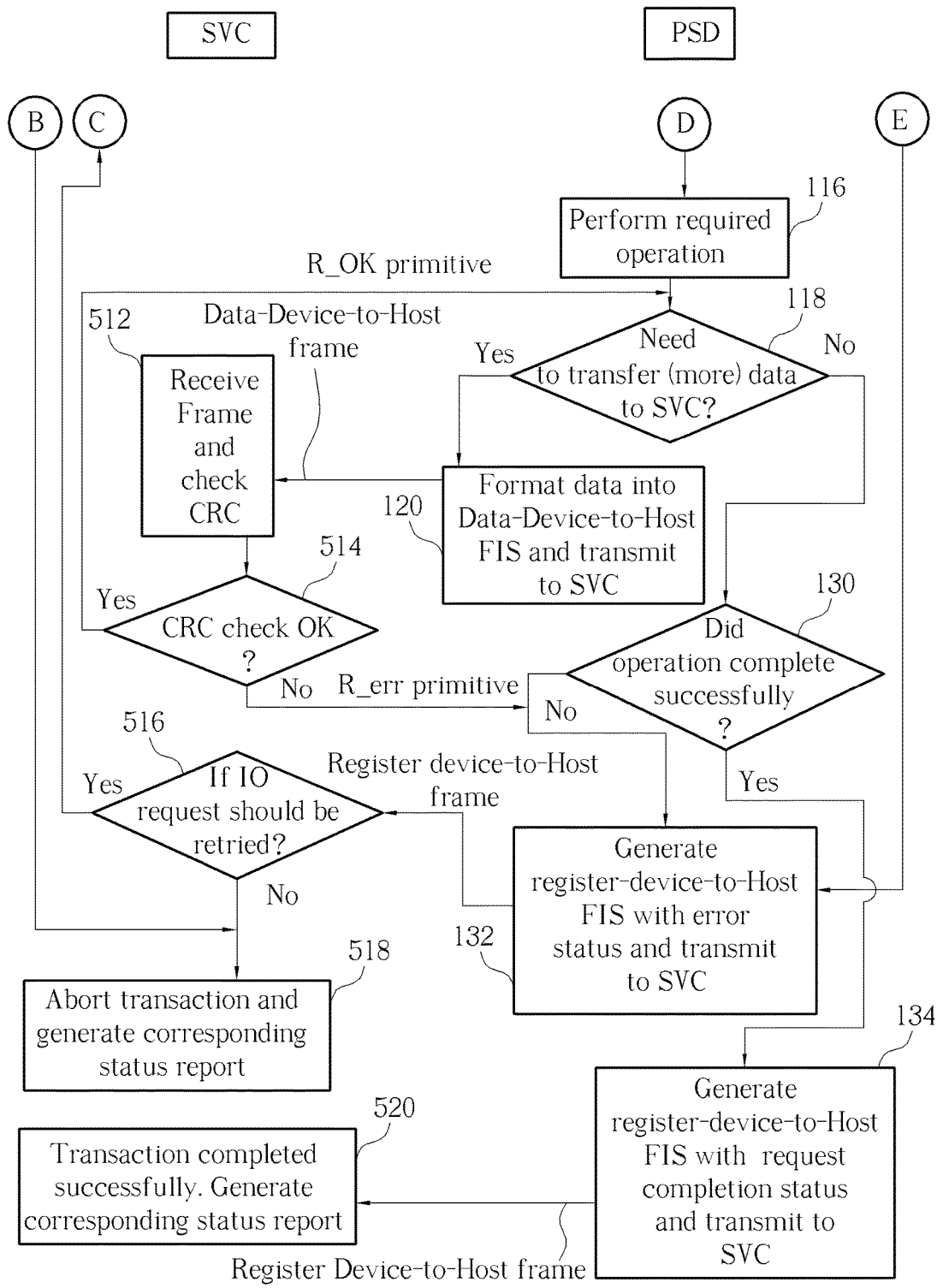

An example of the IO flow between the SVC 200 and a PSD 420 is shown in FIG. 15 and FIG. 16. For each device-side IO request generated as part of a synchronous device sub-operation, the IO request information defining the parameters of the particular IO operation (e.g., destination media section base address, media section length, command indicating operation to be performed, etc.) is formatted into a Frame Information Structure (FIS) of the Register-Host-to-Device type, packaged into a Serial ATA frame and then transmitted to the associated PSD 420 over the serial ATA interconnect to which the specified PSD 420 is connected. Each frame comprises a Cyclic-Redundancy Check (CRC) value that is computed from the data in the frame so that if the data in the frame gets modified in any way en-route to the destination PSD 420, a consistency check of the data performed by the PSD 420 on receipt of the frame against the CRC of the frame will fail and the PSD 420 will respond with an R_ERR primitive sent to the SVC 200 following the receipt of the frame indicating that the frame was not received intact. The SVC 200 may then, at its option, re-send the frame or it may abort the transaction and return a corresponding status report to the requesting entity.

If the frame is received intact, the PSD 420 responds with an R_OK primitive sent to the SVC 200 following the receipt of the frame informing the SVC 200 that the frame was received intact. The PSD 420 parses the request contained in the frame to determine the nature of the operation to be performed and the section of media on which it is to be performed. If the operation is not a valid operation on the specified section of media or the section of media is not a valid one, the PSD 420 responds to the SVC 200 with a corresponding status report, which is done by generating an S-ATA Register-Device-to-Host FIS containing the status information, packaging it into a Serial ATA frame and transmitting it back to the SVC 200. Otherwise, the requested operation is performed.

Prior to or during execution of the requested operation, if the transfer of payload data from the SVC 200 to the PSD 420 is required, the PSD 420 will generate and issue an S-ATA frame conveying a DMA-Activate-Device-to-Host FIS requesting the first set of data be sent. The SVC 200 will then split the data into sections whose lengths do not exceed the maximum length that is allowed to be transmitted in a single frame by the S-ATA protocol. Each section is packaged into a frame of the type Data-Host-to-Device FIS and then shipped to the PSD 420 one at a time. Following the transmission of each frame, the SVC 200 waits for receipt of a frame conveying a DMA-Activate-Device-to-Host FIS from the PSD 420 indicating that the PSD 420 is ready to receive more data prior to transmitting the next frame of data. Each frame of data contains a CRC value generated from the data, which is checked by the PSD 420 for consistency with the data on receipt of each frame. If an inconsistency is discovered between the data in the frame and the CRC of the frame, the IO operation is aborted and the PSD 420 generates a corresponding status report, which is done by generating an S-ATA Register-Device-to-Host FIS comprising the status information, packaging it into a Serial ATA frame and transmitting it back to the SVC 200. On receipt of this status, the SVC 200, may, at its option, re-issue the initial IO request to retry the operation or it may abort the transaction and return a corresponding status report to the requesting entity.

During execution of the requested operation and/or after operation is complete, if the transfer of payload data from the PSD 420 to the SVC 200 is required, the PSD 420 prepares the data (which may require reading the data from the storage medium) and splits it into sections whose lengths do not exceed the maximum length that is allowed to be transmitted in a single frame by the S-ATA protocol. Each section is packaged into a frame of the type Data-Device-to-Host FIS and then transmitted to the SVC 200 one frame at a time. Once again, a CRC value is generated from the data in the frame and sent to the SVC 200 in the frame and is checked by the SVC 200 for consistency with the data on receipt of each frame. If an inconsistency is discovered between the data in the frame and the CRC of the frame, the SVC 200 will respond with an R_ERR primitive sent to the PSD 420 following the receipt of the frame indicating that the frame was not received intact. The PSD 420 will typically then abort the IO operation immediately generating a corresponding status report by generating an S-ATA Register-Device-to-Host FIS containing the status information, packaging it into a Serial ATA frame and transmitting it back to the SVC 200. On receipt of this status, the SVC 200, may, at its option, re-issue the initial IO request to retry the operation or it may abort the transaction and return a corresponding status report to the requesting entity.

If all data is received intact by the SVC 200, it will respond with R_OK primitive to each of the Data-Device-to-Host FIS frames. When all data that needs to be delivered to the SVC 200 as part of the IO request execution is transferred to the SVC 200, the PSD 420 will generate a status report indicating whether the operation completed successfully and, if not, for what reason. This status report is formatted into an S-ATA Register-Device-to-Host FIS, packaged into a S-ATA frame and shipped off back to the SVC 200. The SVC 200 then parses this status report to determine the success or failure of the request. If request failure was reported, the SVC 200, may, at its option, re-issue the initial IO request to retry the operation or it may abort the transaction and return a corresponding status report to the requesting entity.

In a legacy Parallel ATA SVC, the overall flow is similar to the above, however, the initial device-side IO request information that defines the parameters of the IO operation (e.g., destination media section base address, media section length, etc.) is not packaged into a frame that is checked for validity of the data conveyed as it is in S-ATA with the frame CRC. Therefore, such data could be inadvertently corrupted (e.g. due to noise) during the transfer from SVC to PSD may go undetected, potentially leading to a catastrophic data corruption situation in which data gets written to the wrong section of media possibly due to corruption of the destination media section base address and/or media section length that are contained in the initial IO request data. In the S-ATA implementation, such a corruption will be detected because the frame CRC will be inconsistent with the data and the PSD will then abort the command rather than writing the data to or reading the data from the wrong section of the media. This is one of the primary benefits of an S-ATA implementation of an SVC over a P-ATA.

In actual operation, the SVC 200 will typically concurrently process and execute multiple operations in response to multiple queued host-side IO requests. These requests may be from a single host or multiple hosts. These operations may consist of synchronous device sub-operations that execute concurrently. Each such sub-operation may generate multiple device-side IO device requests addressing different PSDs 420. Each such IO device request may involve transferring significant amounts of data between the SVC 200 and the addressed PSD 420 over the device-side IO device interconnect that connects the two. Typically, the SVC 200 will be configured such that IO device requests get distributed amongst the different PSDs 420 and the different device-side IO device interconnects so as to maximize the collective bandwidth of all the PSDs 420 and IO device interconnects. An example of configurationally improving collective bandwidth is combining PSDs 420 into logical media units using a RAID 5 approach rather than RAID 4 combination. In RAID 4, a dedicated parity drive is assigned to which all parity updates are directed. For writes, in which every write requires a parity update, the parity drive may end up being far busier than data drives. For reads, the parity drive is not accessed, meaning that there is one drive that is not contributing to the task of delivering data. RAID 5 distributes the parity equally between all drives so that, assuming IO requests address physical media in an evenly distributed way, no one drive is busier than any other on writes and all drives contribute to the task of delivering data on reads.

In addition, the SVC 200 may be equipped with the means and intelligence to dynamically adjust the distribution of IO device requests among the various PSDs 420 and/or IO device interconnects to further optimize collective PSD/Interconnect bandwidth. An example of this is load-balancing between IO interconnects that connect to the same set of PSDs 420. The SVC 200 may intelligently keep track of the IO device requests that were delivered over each interconnect and from this information determine over which interconnect the next IO device request should be sent in order to maximize the collective bandwidth of the interconnect. Another example is load-balancing data read IO requests between a mirrored set of PSDs 420. Once again, the SVC 200 may intelligently keep track of the IO device requests that were addressed to each PSD 420 to determine to which the next IO device request should be sent in order to maximize the collective bandwidth of the mirrored set of PSDs 420.

With the ability to maximize collective bandwidth of device-side IO device interconnects, overall performance of a storage virtualization subsystem of which the SVC plays a key role may, under certain types of host IO request loads, be limited by this collective bandwidth. Under such conditions, increasing the collective bandwidth may result in significantly better performance. Overall device-side IO device interconnect performance is determined by two factors: the IO-request-execution/data-transfer rate of the interconnect and the number of interconnects over which IO-requests/data-transfers are distributed. The higher the IO-request-execution/data-transfer rate of the interconnect, the greater the overall performance. Similarly, the more interconnects there are over which device-side IO requests and data transfers can be distributed, the greater the overall performance of the device-side IO interconnect subsystem.

As mentioned before, Parallel ATA interconnects do not scale well beyond a certain point because of the number of dedicated signal lines (28) that must be used to form each distinct interconnect. A typical P-ATA SVC may incorporate no more than 12 distinct device-side P-ATA IO device interconnects because of the number of signal lines per interconnect. Parallel SCSI not only suffers from the same drawback with 68 signal lines per interconnect, it is also significantly more expensive and occupies a significantly larger footprint on a printed circuit board (PCB) per interconnect than either P-ATA or S-ATA. A typical SVC might implement 4 to 8 distinct device-side Parallel SCSI IO device interconnects, each interconnect costing several times that of a P-ATA/S-ATA interconnect. Fibre interconnects do not scale well because of the size of the footprint on the PCB and cost per interconnect, typically being an order of magnitude greater than P-ATA/S-ATA.

Serial ATA IO device interconnects scale well because each interconnect only consists of 4 signal lines and they allow for a high level of integration such that a single S-ATA controller IC may support 8 interconnects versus 2 for the standard Parallel SCSI and Fibre of equivalent pin count and size. Further, S-ATA per-interconnect cost is low enough to permit large numbers of device-side S-ATA IO device interconnects to be included on a single cost-effective SVC.

One limitation of a "pure" Serial ATA SVC in which all of the device-side IO device interconnects are Serial ATA is that the number of PSDs that can be connected is limited by the number of device-side IO device interconnects that can be packed onto a single SVC, and, because the S-ATA specification only allows for maximum signal line lengths of 1.5 m, the PSDs connected to one SVC must be packed close enough so that no signal line length exceeds 1.5 m. A typical S-ATA storage virtualization subsystem will only provide for connection of a maximum of 16 S-ATA PSDs because of these limitations. So a "pure" S-ATA storage virtualization subsystem is unable to match the expandability of a Fibre FC-AL storage virtualization subsystem, which will typically allow for connection of up to 250 PSDs via connection of external expansion chassis on the same set of device-side IO device interconnects.

In order to overcome this limitation, the present invention optionally includes one or more expansion device-side multiple-device IO device interconnects, herein referred to as device-side expansion ports, such as Parallel SCSI or Fibre FC-AL on the SVC. These interconnects will typically be wired in such a way as to allow external connection of external expansion chassis. These chassis could be simple "native" just a bunch of drives (JBODs) of PSDs directly connected to the interconnect without any intervening conversion circuitry or could be intelligent JBOD emulation subsystems that emulate "native" JBODs using a combination of S-ATA or P-ATA PSDs and a single or redundant set of SVCS that provide the conversion from the multiple-device IO device interconnect protocol that provides the connection of the JBOD subsystem to the primary storage virtualization subsystem to the device-side IO device interconnect (S-ATA or P-ATA) protocol that provides the connection between the JBOD SVC(s) and the PSDs that they manage.

Figure 17:
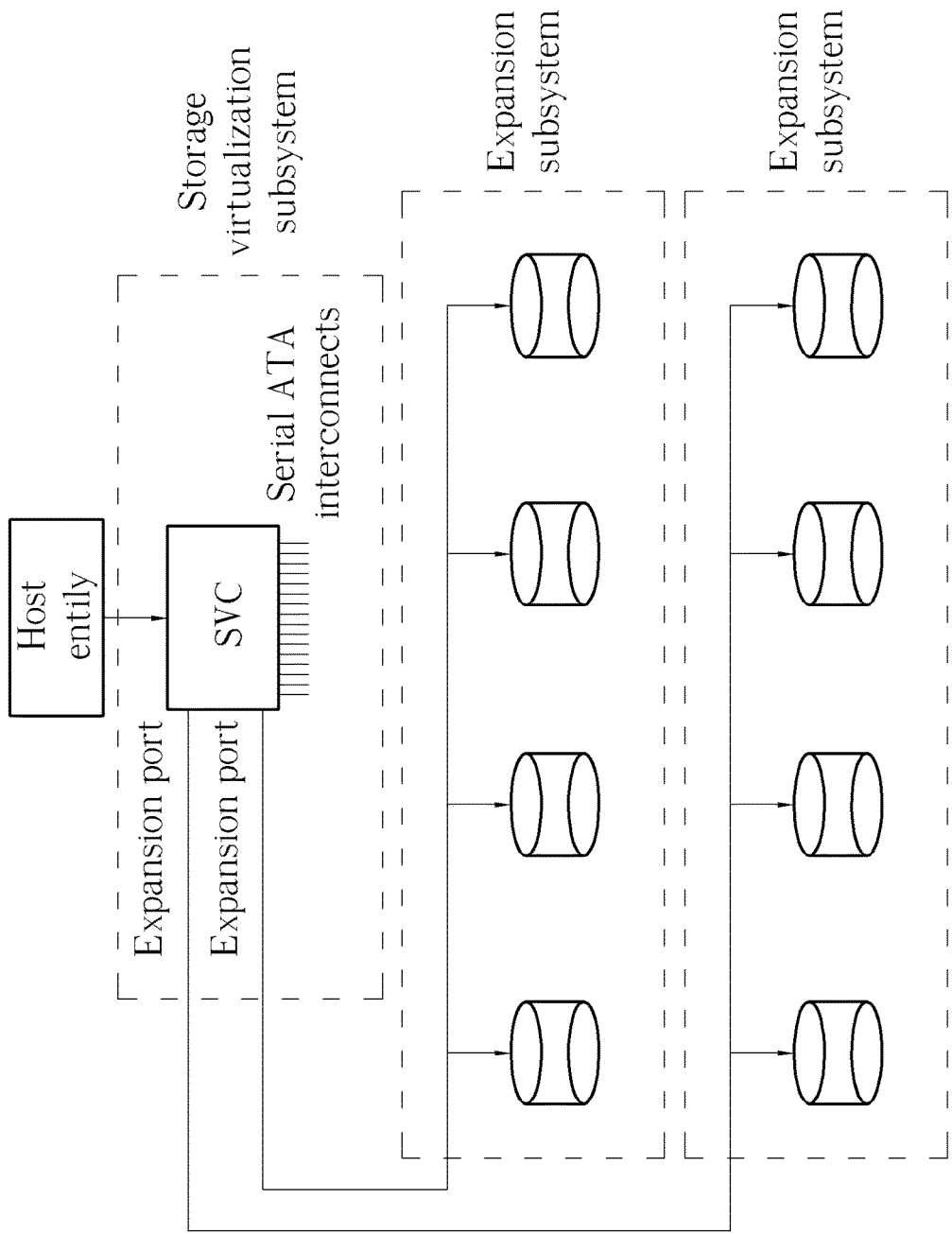
FIG. 17 is a block diagram of a storage virtualization subsystem supporting device-side expansion ports.
Figure 18:
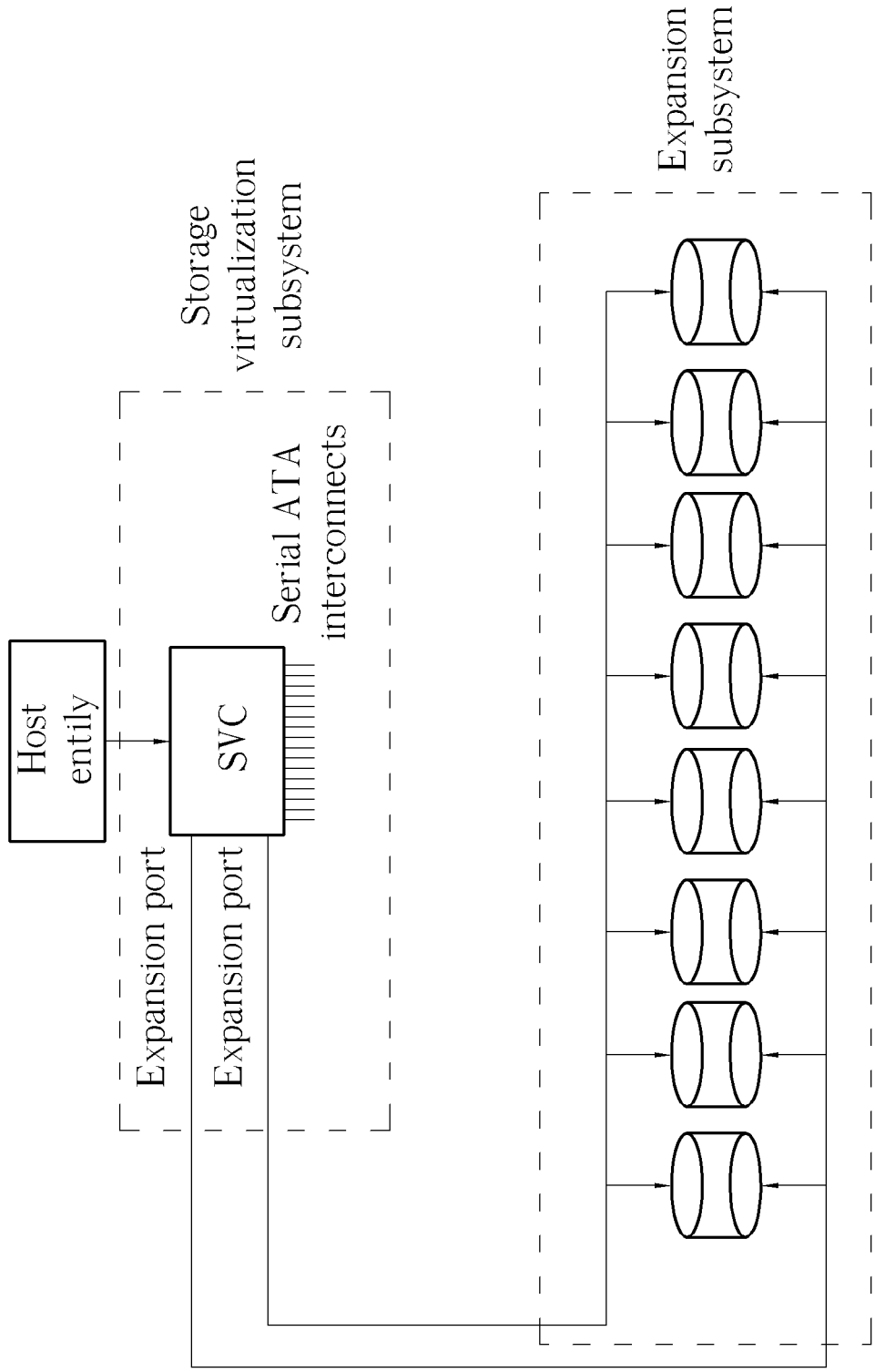
FIG. 18 is a block diagram of a storage virtualization subsystem supporting device-side expansion ports.

Please refer to FIG. 17, which is an embodiment diagram of a storage virtualization subsystem supporting device-side expansion ports. In FIG. 17, each storage unit to which the expansion ports are connected are single-ported. However, if the storage units to which the expansion ports are connected are dual-ported, then a SVC equipped with one or more pairs of redundantly-configured expansion ports could have one of the ports in a redundant pair connected to one of the ports in the dual-ported pair in a storage unit and the other port in the redundant pair connected to the other port in the storage unit's dual-ported pair. FIG. 18 depicts such a configuration.

In this case, if one of the SVC ports in the redundant pair malfunctions, or one of the storage unit ports in the dual-port pair malfunctions, or one of the IO device interconnects connecting one of the SVC ports in the redundant pair to one of the storage unit ports in the dual-port pair breaks or becomes blocked, access to the storage unit by the SVC can still be accomplished via the alternate path consisting of the interconnect connecting the alternate SVC port to the alternate storage unit port.

There is a variation on the Serial ATA storage virtualization subsystem that uses Parallel ATA PSDs rather than Serial ATA PSDs. It incorporates an SATA-to-PATA conversion circuit that resides in close proximity to the P-ATA PSD that converts S-ATA signals and protocol to P-ATA and back again in the opposite direction. While there is a short length of P-ATA signal traces between the SATA-to-PATA conversion circuit and the PSD which will potentially be vulnerable to undetected corruption of information passed between the SVC and the PSD, the backplane signal traces that are especially vulnerable to noise and cross-talk because of their length and their number (as mentioned before, P-ATA requires 28 signal traces per interconnect) will be protected from undetected data corruption by virtue of S-ATA improved error detection capabilities. Other than this, virtually all of the benefits of S-ATA storage virtualization subsystem over ones incorporating other standard device-side IO device interconnects are still achieved in this variation.

The importance of a Serial ATA storage virtualization subsystem that uses Parallel ATA PSDs lies in the fact that, in the short term, supplies of Serial ATA drives will still be relatively short compared to Parallel ATA, and Serial ATA drives will still be significantly more expensive. During this transitional period, this kind of a subsystem will allow P-ATA PSDs to be substituted for S-ATA PSDs, eliminating the concerns over S-ATA PSD supply and cost. Such a subsystem will typically place the conversion circuit in the removable canister in which the PSD resides. The removable canister allows the PSD and any related circuitry to be easily swapped out in the event of a PSD and/or related circuitry needing servicing. By placing the conversion circuit in the canister, when S-ATA drives become readily available at a competitive price, the entire canister contents could be exchanged for an S-ATA PSD and S-ATA related circuitry.

Figure 19:
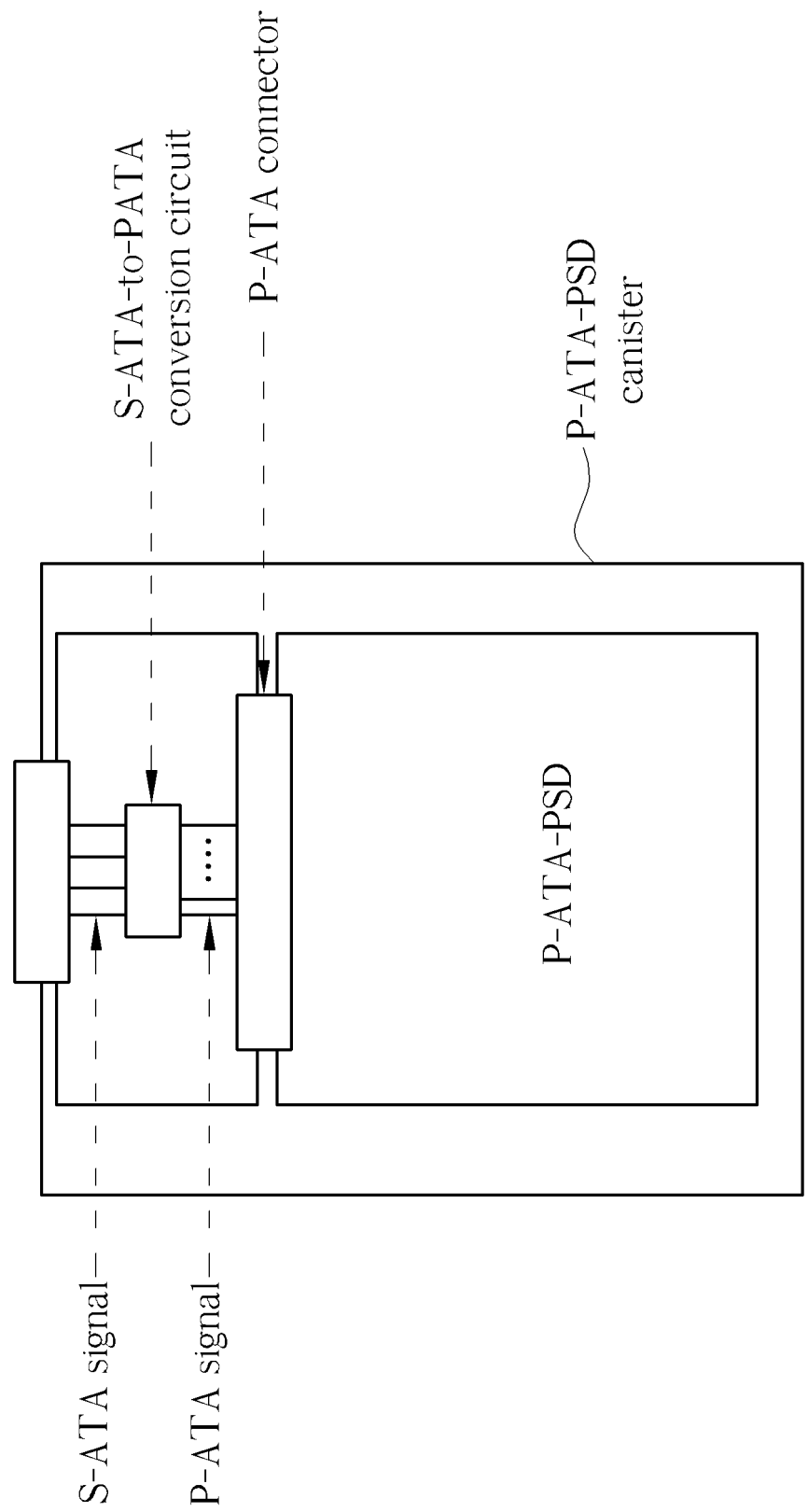
FIG. 19 is a block diagram of a removable P-ATA-PSD canister.
Figure 20:
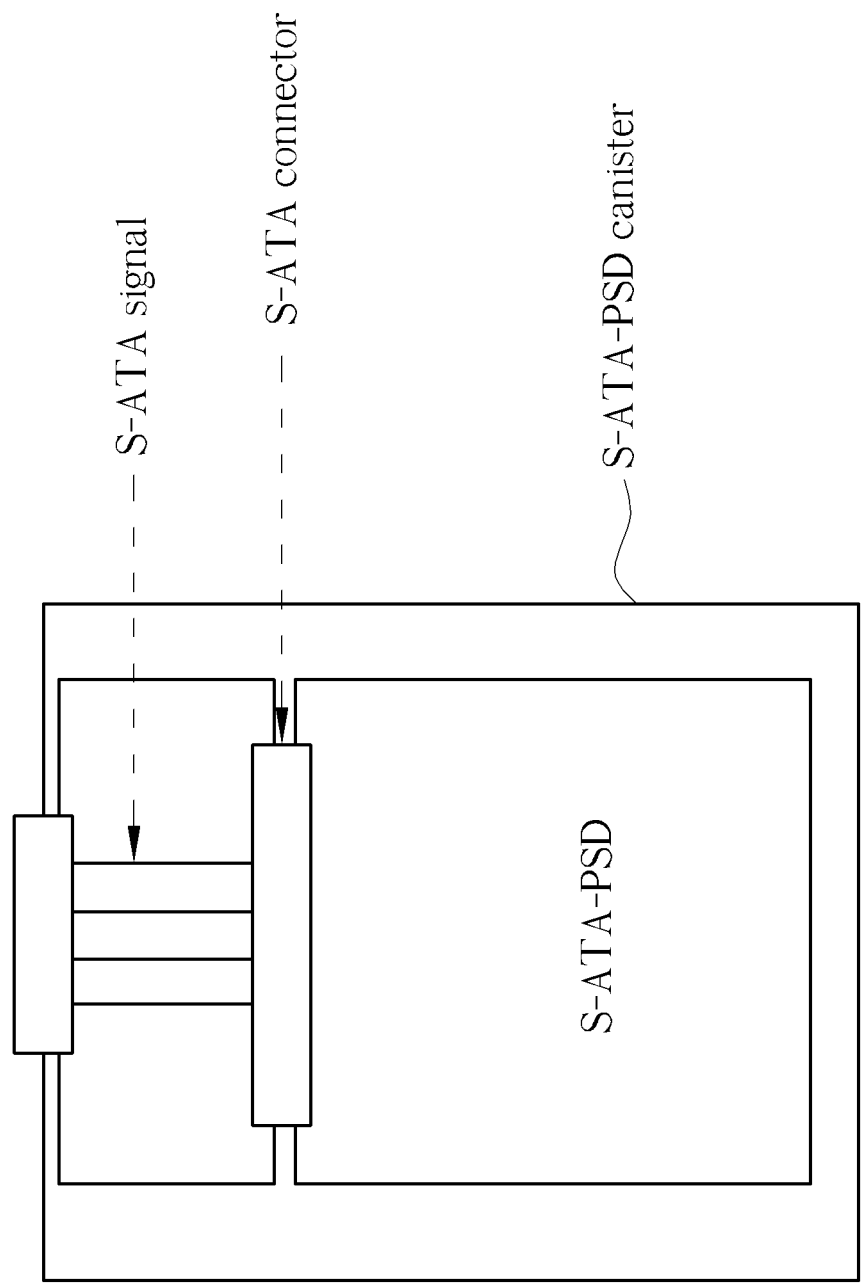
FIG. 20 is a block diagram of a removable S-ATA-PSD canister.

Please refer to FIG. 19 and FIG. 20. FIG. 19 depicts a block diagram of a removable P-ATA-PSD canister while FIG. 20 depicts a block diagram of a removable S-ATA-PSD canister. Both canisters of FIG. 19 and FIG. 20 have S-ATA IO device interconnect coming in from the SVC. The primary difference is in the presence of an SATA-to-PATA conversion circuit in the removable P-ATA-PSD canister which is absent from the removable S-ATA-PSD canister.

Another feature that an SVC might typically implement is redundancy in the host-side interconnects in which multiple host-side interconnect ports are included on the SVC and LMUs are presented to the host identically over two or more of these interconnects. This feature is designed to allow the host the ability to maintain access to the LMU even if one of the interconnects and/or ports on the interconnect should break, become blocked or otherwise malfunction.

In this implementation, the two separate SVC host-side ports connect to two entirely separate host-side IO device interconnects and host ports (not shown). In an implementation supporting redundancy in the host-side interconnects, the SVC would present the same set of logical media units in an identical fashion on both ports.

Storage virtualization subsystems typically also include functionality that allows devices in the subsystems, such as power supplies, fans, temperature monitors, etc, to be managed and monitored by the SVC(s). As mentioned before, this functionality is commonly referred to as enclosure management services (EMS). Often times, EMS is implemented using intelligent circuitry, that is circuitry that includes a CPU and runs a software program to achieve the desired functionality. Traditional Parallel SCSI and Fibre SV subsystems have typically relied on the standard SCSI protocols SAF-TE and SES, respectively, as the primary communication mechanism that the SVC uses to communicate with the SVS's EMS. These protocols, in turn, rely on a connection between the SVC(s) and the SVS consisting of an IO device interconnect that provides transport of SCSI command protocol, such as Parallel SCSI or Fibre interconnects. However, in the typical S-ATA SVS, there is no such connection between the SVC (s) and the "local" SVS (note that the expansion ports do provide such a connection to "remote" JBOD subsystems, but not to the "local" SVS). Such a connection could be implemented, but it would increase the cost of the SVS significantly. A more cost-effective solution would be to use a low-cost interconnect and communicate over this interconnect using proprietary protocols.

I2C is a low-cost interconnect that supports two-way transfer of data at an acceptable rate of transfer. It is commonly used in PCs to allow the CPU to manage and monitor motherboard and other device status. It is well suited to the task of providing a communication medium between the SVC(s) and the EMS in the local SVS, especially in S-ATA SVS' that do not already have an interconnect connecting the SVC (s) to the SVS. It does not, by standard, support transport of SCSI command protocol, however, so any implementation using it as the primary communication medium between the SVCS and the EMS in the local SVS will communicate using an alternate protocol, typically a proprietary one.

With I2C as the primary communication medium, EMS could be implemented in two ways. The first is using intelligent circuitry that communicates with the SVC using an intelligent protocol similar to SAF-TE/SES. The second is to integrate "dumb" off-the-shelf I2C latches and/or status monitoring ICs into a management/monitoring circuit and leave all the intelligence to the SVC. The former option has the advantage of allowing the EMS to provide more advanced services, value, and customizations. However, it is typically complicated and expensive to implement. The latter option is easy and inexpensive to implement but typically cannot support advanced functionality.

PSD subsystems in storage virtualization subsystems are designed to emulate typically implement enclosure management services that can be directly managed and monitored by a host over the IO device interconnects that also serve as the primary access interconnects for the PSDs in the subsystem. In these implementations, the EMS circuitry is intelligent and implements standard SCSI protocols for managing and monitoring EMS, such as SAF-TE and SES, that can be transported over the primary access interconnects. In these implementations, EMS controllers will either connect directly to one or more of the primary access IO device interconnects to allow communication with the host directly, a configuration herein referred to as "direct-connect", or rely on pass-through mechanisms supported by those devices that are directly connected to the primary access interconnects (typically, PSDs) to forward requests and associated data from the host to the EMS controller and responses and associated data from the EMS controller to the host, herein referred to as "device-forwarded". Direct connect EMS implementations provide independence from PSDs such that a failure or absence of one or even all PSDs would not affect the operation or accessibility of the EMS. The drawback of direct connect EMS implementations is that they are typically more expensive and complicated to implement. The advantage of device-forwarded EMS implementation is in the ease of implementation and relative cost effectiveness, but suffers from the weakness that failing or absent PSDs could result in the loss of access to the EMS by the host(s).

In order to enhance compatibility with hosts that are designed to interface with actual PSD subsystems, a SVS that is equipped with EMS might support one or more standard SCSI EMS management protocols and one or both of the connection configurations described above, direct-connect and device-forwarded. For direct-connect emulations, the SVC will present the EMS services on a host-side IO device interconnect as a one or more ID/LUNs (logical unit number). The EMS may have dedicated interconnect IDs assigned to it or it may simply have assigned to it LUNs on IDs that already present on other LUNs. For SAF-TE emulations, the SVC must present EMS SAF-TE device(s) on dedicated IDs. For direct-connect SES emulations, the EMS SES device (s) could be presented on dedicated IDs or on IDs presenting other LUNs. For device-forwarded emulations, the SVC will simply include information in the INQUIRY string of the virtual PSDs responsible for forwarding the EMS management requests that indicates to the host that one of the functions of the said PSD is to forward such requests to the EMS. Typically, multiple virtual PSDs, and may be even all of the virtual PSDs presented on the interconnect will be presented as forwarders of EMS management requests so that the absence or failure of one or more virtual PSDs will not result in loss of access to the EMS.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A storage virtualization computer system comprising:
   a host entity for issuing host IO requests;
   an external storage virtualization controller (SVC) comprising at least one I/O controller and being coupled to said host entity for executing IO operations in response to said host IO requests; and
   a group of physical storage devices (PSDs), each coupled to the external storage virtualization controller through a point-to-point serial-signal interconnect, for providing storage to the storage virtualization computer system through the external storage virtualization controller;
   wherein said external storage virtualization controller is configured to define at least one logical media unit (LMU) consisting of sections of said group of PSDs;
   wherein the host IO requests are parsed to determine what operation is to be performed and on which section(s) of the LMU the operation is to be performed; and
   wherein when the operation comprises internally-emulated, asynchronous device sub-operations, then the external SVC executes the associated sub-operations including transferring any associated data to/from the host entity and then, when there is a failed operation, the external SVC generates a status report and responds to the host entity with the status report indicating the failed operation;
   wherein the asynchronous device sub-operations comprise device-side IO requests to be sent to the PSDs, and when one of the device-side IO requests does not complete successfully, the SVC engages a backup operation that allows successful completion of the sub-operations, where when one of the PSDs is inaccessible, the backup operation includes generating at least one other device-side IO request to at least one media section that is different from a media section to be accessed by the one device-side IO request which does not complete successfully; and
   wherein when one of the host IO requests from the host entity is received by the SVC, an IO complete report that the one of the host I/O requests is successfully complete is first issued to the host entity by the SVC before the SVC completes the operation performed on the section(s) of the LMU associated with said one host IO request.

2. The storage virtualization computer system of claim 1, wherein the operation further comprises a synchronous device sub-operation.

3. The storage virtualization computer system of claim 1, wherein said point-to-point serial-signal interconnect is a Serial Advanced Technology Attachment (SATA) IO device-side interconnect.

4. The storage virtualization computer system of claim 1, wherein said group of the PSDs comprises hard disk drives (HDDs) or solid state drives (SSDs).

5. The storage virtualization computer system of claim 1, wherein said group of the PSDs comprises Serial Advanced Technology Attachment (SATA) PSDs.

6. The storage virtualization computer system of claim 1, wherein said group of the PSDs comprises Parallel Advanced Technology Attachment (PATA) PSDs and a serial-to-parallel converter is provided between a device-side IO device interconnect controller and said PATA PSDs.

7. The storage virtualization computer system of claim 1, further comprising a detachable canister attached to said storage virtualization controller for containing one of said group of the PSDs therein.

8. The storage virtualization computer system of claim 1, wherein one of said group of the PSDs is detached from said storage virtualization controller when said storage virtualization controller is on-line.

9. The storage virtualization computer system of claim 1, wherein a new PSD is attached to said storage virtualization controller when said storage virtualization controller is on-line.

10. The storage virtualization computer system of claim 1, wherein said group of PSDs include a first set of PSDs and a second set of PSDs, said first set of PSDs and said external storage virtualization controller are in the same enclosure, said first set of PSDs and said second set of PSDs are not received in a same enclosure, and said external storage virtualization controller further comprises at least one multiple-device device-side expansion port for coupling to said second set of said PSDs.

11. The storage virtualization computer system of claim 1, wherein said storage virtualization controller comprises:
   a central processing circuitry for performing IO operations in response to said host IO requests of said host entity;
   at least one IO device interconnect controller coupled to said central processing circuitry;

at least one host-side IO device interconnect port provided in a said at least one IO device interconnect controller for coupling to said host entity; and at least one device-side IO device interconnect port provided in a said at least one IO device interconnect controller for coupling to a said at least one physical storage device.

12. The storage virtualization computer system of claim 11, wherein said at least one host-side IO device interconnect port and said at least one device-side IO device interconnect port are provided in a same IO device interconnect controller.

13. The storage virtualization computer system of claim 11, wherein said at least one host-side IO device interconnect port and said at least one device-side IO device interconnect port are provided in different IO device interconnect controllers.

14. The storage virtualization computer system of claim 11, wherein said at least one said host-side IO device interconnect port is Fibre Channel supporting point-to-point connectivity in target mode.

15. The storage virtualization computer system of claim 11, wherein said at least one said host-side IO device interconnect port is Fibre Channel supporting private loop connectivity in target mode.

16. The storage virtualization computer system of claim 11, wherein said at least one said host-side IO device interconnect port is Fibre Channel supporting public loop connectivity in target mode.

17. The storage virtualization computer system of claim 11, wherein said at least one said host-side IO device interconnect port is parallel Small Computer System Interface (SCSI) operating in target mode.

18. The storage virtualization computer system of claim 11, wherein said at least one said host-side IO device interconnect port is ethernet supporting the Internet Small Computer System Interface (iSCSI) protocol operating in target mode.

19. The storage virtualization computer system of claim 11, wherein said at least one said host-side IO device interconnect port is Serial-Attached Small Computer System Interface (SAS) operating in target mode.

20. The storage virtualization computer system of claim 11, wherein said at least one said host-side IO device interconnect port is Serial Advanced Technology Attachment (SATA) operating in target mode.

21. The storage virtualization computer system of claim 11, wherein said external SVC issues a device-side IO request to said IO device interconnect controller, and said IO device interconnect controller re-formats said device-side IO request and accompanying IO data into at least one data packet for transmission to said group of PSDs through said device-side IO device interconnect port.

22. The storage virtualization computer system of claim 11 further comprising an enclosure management services mechanism that is implemented using intelligent circuitry which includes a CPU and runs a software program for managing and monitoring devices belonging to the storage virtualization computer system.

23. The storage virtualization computer system of claim 1, wherein the external SVC is equipped with the means and intelligence to dynamically adjust the distribution of the device-side I/O requests among the various PSDs 420 and/or IO device interconnects to further optimize a collective PSD/Interconnect bandwidth.

24. The storage virtualization computer system of claim 1, wherein said external storage virtualization controller is configured to provide a mapping that allows at least one section of the at least one LMU to be accessible to the host entity.

25. A storage virtualization subsystem for providing storage to a host entity for issuing host IO requests, comprising:
an external storage virtualization controller (SVC) comprising at least one I/O controller and being coupled to said host entity for executing IO operations in response to said host IO requests; and
a group of physical storage devices (PSDs), each coupled to the external storage virtualization controller through a point-to-point serial-signal interconnect, for providing storage to the host entity through the external storage virtualization controller;
wherein said external storage virtualization controller is configured to define at least one logical media unit (LMU) consisting of sections of said group of PSDs;
wherein the host IO requests are parsed to determine what operation is to be performed and on which section(s) of the LMU the operation is to be performed;
wherein when the operation comprises internally-emulated, asynchronous device sub-operations, then the SVC executes the associated sub-operations including transferring any associated data to/from the host entity and then, when there is a failed operation, the SVC generates a status report and responds to the host entity with the status report indicating the failed operation;
wherein the asynchronous device sub-operations comprise device-side IO requests to be sent to the PSDs, and when one of the device-side IO requests does not complete successfully, the SVC engages backup operation that allows successful completion of the sub-operations, where when one of the PSDs is inaccessible, the backup operation includes generating at least one other device-side IO request to at least one media section that is different from a media section to be accessed by the one device-side IO request which does not complete successfully; and
wherein when one of the host IO requests from the host entity is received by the SVC, an IO complete report that the one of the host I/O requests is successfully complete is first issued to the host entity by the SVC before the SVC completes the operation performed on the section(s) of the LMU associated with said one host IO request.

26. The storage virtualization subsystem of claim 25, wherein the operation further comprises a synchronous device sub-operation.

27. The storage virtualization subsystem of claim 25, wherein said point-to-point serial-signal interconnect is a Serial Advanced Technology Attachment (SATA) IO device-side interconnect.

28. The storage virtualization subsystem of claim 25, wherein said group of the PSDs comprises hard disk drives (HDDs) or solid state drives (SSDs).

29. The storage virtualization subsystem of claim 25, wherein said group of the PSDs comprises Serial Advanced Technology Attachment (SATA) PSDs.

30. The storage virtualization subsystem of claim 25, wherein said group of the PSDs comprises Parallel Advanced Technology Attachment (PATA) PSDs and a serial-to-parallel converter is provided between said device-side IO device interconnect controller and said PATA PSDs.

31. The storage virtualization subsystem of claim 25 further comprising a detachable canister attached to said storage virtualization controller for containing one of said group of the PSDs therein.

32. The storage virtualization subsystem of claim 25, wherein one of said group of the PSDs is detached from said storage virtualization controller when said storage virtualization controller is on-line.

33. The storage virtualization subsystem of claim 25, wherein a new PSD is attached to said storage virtualization controller when said storage virtualization controller is on-line.

34. The storage virtualization subsystem of claim 25, wherein said group of PSDs include a first set of PSDs and a second set of PSDs, said first set of PSDs and said external storage virtualization controller are in the same enclosure, said first set of PSDs and said second set of PSDs are not received in a same enclosure, and said external storage virtualization controller further comprises at least one multiple-device device-side expansion port for coupling to said second set of said PSDs.

35. The storage virtualization subsystem of claim 25, wherein said storage virtualization controller comprises:
a central processing circuitry for performing IO operations in response to said host IO requests of said host entity;
at least one IO device interconnect controller coupled to said central processing circuitry;
at least one host-side IO device interconnect port provided in a said at least one IO device interconnect controller for coupling to said host entity; and
at least one device-side IO device interconnect port provided in a said at least one IO device interconnect controller for coupling to a said at least one physical storage device.

36. The storage virtualization subsystem of claim 35, wherein said at least one host-side IO device interconnect port and said at least one device-side IO device interconnect port are provided in a same IO device interconnect controller.

37. The storage virtualization subsystem of claim 35, wherein said at least one host-side IO device interconnect port and said at least one device-side IO device interconnect port are provided in different IO device interconnect controllers.

38. The storage virtualization subsystem of claim 35, wherein said at least one said host-side IO device interconnect port is Fibre Channel supporting point-to-point connectivity in target mode.

39. The storage virtualization subsystem of claim 35, wherein said at least one said host-side IO device interconnect port is Fibre Channel supporting private loop connectivity in target mode.

40. The storage virtualization subsystem of claim 35, wherein said at least one said host-side IO device interconnect port is Fibre Channel supporting public loop connectivity in target mode.

41. The storage virtualization subsystem of claim 35, wherein said at least one said host-side IO device interconnect port is parallel Small Computer System Interface (SCSI) operating in target mode.

42. The storage virtualization subsystem of claim 35, wherein said at least one said host-side IO device interconnect port is ethernet supporting the Internet Small Computer System Interface (iSCSI) protocol operating in target mode.

43. The storage virtualization subsystem of claim 35, wherein said at least one said host-side IO device interconnect port is Serial-Attached SCSI (SAS) operating in target mode.

44. The storage virtualization subsystem of claim 35, wherein said at least one said host-side IO device interconnect port is Serial Advanced Technology Attachment (SATA) operating in target mode.

45. The storage virtualization subsystem of claim 35, wherein said external SVC issues a device-side IO request to said IO device interconnect controller, and said IO device interconnect controller re-formats said device-side IO request and accompanying IO data into at least one data packet for transmission to said group of PSDs through said device-side IO device interconnect port.

46. The storage virtualization subsystem of claim 35 further comprising an enclosure management services mechanism that is implemented using intelligent circuitry which includes a CPU and runs a software program for managing and monitoring devices belonging to the storage virtualization subsystem.

47. The storage virtualization subsystem of claim 25, wherein the external SVC is equipped with the means and intelligence to dynamically adjust the distribution of the device-side I/O requests among the various PSDs 420 and/or IO device interconnects to further optimize a collective PSD/Interconnect bandwidth.

48. The storage virtualization subsystem of claim 25, wherein said external storage virtualization controller is configured to provide a mapping that allows at least one section of the at least one LMU to be accessible to the host entity.

49. An external storage virtualization controller (SVC) for executing IO operations in response to host IO requests from a host entity, comprising:
a central processing circuitry for performing IO operations in response to said host IO requests of said host entity;
at least one IO device interconnect controller coupled to said central processing circuitry;
at least one host-side IO device interconnect port provided in a said at least one IO device interconnect controller for coupling to said host entity; and
at least one device-side IO device interconnect port provided in a said at least one IO device interconnect controller for coupling to and performing point-to-point serial-signal transmission with a group of physical storage devices (PSDs);
wherein said external storage virtualization controller is configured to define at least one logical media unit (LMU) consisting of sections of said group of PSDs;
wherein the host IO requests are parsed to determine what operation is to be performed and on which section(s) of the LMU the operation is to be performed;
wherein when the operation comprises internally-emulated, asynchronous device sub-operations, then the SVC executes the associated sub-operations including transferring any associated data to/from the host entity and then, when there is a failed operation, the SVC generates a status report and responds to the host entity with the status report indicating the failed operation;
wherein the asynchronous device sub-operations comprise device-side IO requests to be sent to the PSDs, and when one of the device-side IO requests does not complete successfully, the SVC engages backup operation that allows successful completion of the sub-operations, where when one of the PSDs is inaccessible, the backup operation includes generating at least one other device-side IO request to at least one media section that is different from a media section to be accessed by the one device-side IO request which does not complete successfully; and wherein when one of the host IO requests from the host entity is received by the SVC, an IO complete report that the one of the host I/O requests is successfully complete is first issued to the host entity by the SVC before the SVC completes the operation performed on the section(s) of the LMU associated with said one host IO request.

50. The external storage virtualization controller of claim 49, wherein the operation further comprises a synchronous device sub-operation.

51. The external storage virtualization controller of claim 49, wherein said point-to-point serial-signal interconnect is a Serial Advanced Technology Attachment (SATA) IO device-side interconnect.

52. The external storage virtualization controller of claim 49, wherein said group of the PSDs comprises hard disk drives (HDDs) or solid state drives (SSDs).

53. The external storage virtualization controller of claim 49, wherein said group of the PSDs comprises Serial Advanced Technology Attachment (SATA) PSDs.

54. The external storage virtualization controller of claim 49, wherein said group of the PSDs comprises Parallel Advanced Technology Attachment (PATA) PSDs and a serial-to-parallel converter is provided between said device-side IO device interconnect controller and said PATA PSDs.

55. The external storage virtualization controller of claim 49 further comprising a detachable canister attached to said storage virtualization controller for containing one of said group of the PSDs therein.

56. The external storage virtualization controller of claim 49, wherein one of said group of the PSDs is detached from said storage virtualization controller when said storage virtualization controller is on-line.

57. The external storage virtualization controller of claim 49, wherein a new PSD is attached to said storage virtualization controller when said storage virtualization controller is on-line.

58. The external storage virtualization controller of claim 49, wherein said group of PSDs include a first set of PSDs and a second set of PSDs, said first set of PSD and said external storage virtualization controller are in the same enclosure, said first set of PSDs and said second set of PSDs are not received in a same enclosure, and said external storage virtualization controller further comprises at least one multiple-device device-side expansion port for coupling to said second set of said PSDs.

59. The external storage virtualization controller of claim 49, wherein said at least one host-side IO device interconnect port and said at least one device-side IO device interconnect port are provided in a same IO device interconnect controller.

60. The external storage virtualization controller of claim 49, wherein said at least one host-side IO device interconnect port and said at least one device-side IO device interconnect port are provided in different IO device interconnect controllers.

61. The external storage virtualization controller of claim 49, wherein said at least one said host-side IO device interconnect port is Fibre Channel supporting point-to-point connectivity in target mode.

62. The external storage virtualization controller of claim 49, wherein said at least one said host-side IO device interconnect port is Fibre Channel supporting private loop connectivity in target mode.

63. The external storage virtualization controller of claim 49, wherein said at least one said host-side IO device interconnect port is Fibre Channel supporting public loop connectivity in target mode.

64. The external storage virtualization controller of claim 49, wherein said at least one said host-side IO device interconnect port is parallel SCSI operating in target mode.

65. The external storage virtualization controller of claim 49, wherein said at least one said host-side IO device interconnect port is ethernet supporting the iSCSI protocol operating in target mode.

66. The external storage virtualization controller of claim 49, wherein said at least one said host-side IO device interconnect port is Serial-Attached Small Computer System Interface (SAS) operating in target mode.

67. The external storage virtualization controller of claim 49, wherein said at least one said host-side IO device interconnect port is Serial Advanced Technology Attachment (SATA) operating in target mode.

68. The external storage virtualization controller of claim 49, wherein said external SVC issues a device-side IO request to said IO device interconnect controller, and said IO device interconnect controller re-formats said device-side IO request and accompanying IO data into at least one data packet for transmission to said group of PSDs through said device-side IO device interconnect port.

69. The external storage virtualization controller of claim 49 further comprising an enclosure management services mechanism that is implemented using intelligent circuitry which includes a CPU and runs a software program for managing and monitoring devices belonging to a storage virtualization subsystem.

70. The external storage virtualization controller of claim 49, wherein the external SVC is equipped with the means and intelligence to dynamically adjust the distribution of the device-side I/O requests among the various PSDs 420 and/or IO device interconnects to further optimize a collective PSD/Interconnect bandwidth.

71. The external storage virtualization controller of claim 49, wherein said external storage virtualization controller is configured to provide a mapping that allows at least one section of the at least one LMU to be accessible to the host entity.

72. A method for performing storage virtualization in a computer system with an external storage virtualization controller (SVC) of the computer system, comprising:

receiving host IO requests from a host entity of the computer system with the storage virtualization controller;

parsing the host IO requests with the storage virtualization controller to decide at least one IO operation to perform in response to said host IO requests; and performing at least one IO operation with the storage virtualization controller to access a group of physical storage devices (PSDs) of the computer system in point-to-point serial-signal transmission;

wherein said external storage virtualization controller is configured to define at least one logical media unit (LMU) consisting of sections of said group of PSDs;

wherein the host IO requests are parsed to determine what operation is to be performed and on which section(s) of the LMU the operation is to be performed;

wherein when the operation comprises internally-emulated, asynchronous device sub-operations, then the SVC executes the associated sub-operations including transferring any associated data to/from the host entity and then, when there is a failed operation, the SVC generates a status report and responds to the host entity with the status report indicating the failed operation;

wherein the asynchronous device sub-operations comprise device-side IO requests to be sent to the PSDs, and when one of the device-side IO requests does not complete successfully, the SVC engages backup operation that allows successful completion of the sub-operations, where when one of the PSDs is inaccessible, the backup operation includes generating at least one other device-side IO request to at least one media section that is different from a media section to be accessed by the one media section which does not complete successfully; and wherein when one of the host IO requests from the host entity is received by the SVC, an IO complete report that the one of I/O requests is successfully complete is first issued to the host entity by the SVC before the SVC completes the operation performed on the section(s) of the LMU associated with said one host IO request.

73. The method of claim 72, wherein the operation further comprises a synchronous device sub-operation.

74. The method of claim 72, wherein said point-to-point serial-signal interconnect is a Serial ATA IO device-side interconnect.

75. The method of claim 72, wherein said group of the PSDs comprises hard disk drives (HDDs) or solid state drives (SSDs).

76. The method of claim 72, wherein said group of the PSDs comprises Serial Advanced Technology Attachment (SATA) PSDs.

77. The method of claim 72, wherein said group of the PSDs comprises Parallel Advanced Technology Attachment (PATA) PSDs and a serial-to-parallel converter is provided between said device-side IO device interconnect controller and said PATA PSDs.

78. The method of claim 72 further comprising a detachable canister attached to said storage virtualization controller for containing one of said group of the PSDs therein.

79. The method of claim 72, wherein one of said group of the PSDs is detached from said storage virtualization controller when said storage virtualization controller is on-line.

80. The method of claim 72, wherein a new PSD is attached to said storage virtualization controller when said storage virtualization controller is on-line.

81. The method of claim 72, wherein said group of PSDs include a first set of PSDs and a second set of PSDs, said first set of PSDs and said external storage virtualization controller are in the same enclosure, said first set of PSDs and said second set of PSDs are not received in a same enclosure, and said external storage virtualization controller further comprises at least one multiple-device device-side expansion port for coupling to said second set of said PSDs.

82. The method of claim 72, wherein said storage virtualization controller comprises:
a central processing circuitry for performing IO operations in response to said host IO requests of said host entity;
at least one IO device interconnect controller coupled to said central processing circuitry;
at least one host-side IO device interconnect port provided in a said at least one IO device interconnect controller for coupling to said host entity; and
at least one device-side IO device interconnect port provided in a said at least one IO device interconnect controller for coupling to a said at least one physical storage device.

83. The method of claim 82, wherein said at least one host-side IO device interconnect port and said at least one device-side IO device interconnect port are provided in a same IO device interconnect controller.

84. The method of claim 82, wherein said at least one host-side IO device interconnect port and said at least one device-side IO device interconnect port are provided in different IO device interconnect controllers.

85. The method of claim 82, wherein said at least one said host-side IO device interconnect port is Fibre Channel supporting point-to-point connectivity in target mode.

86. The method of claim 82, wherein said at least one said host-side IO device interconnect port is Fibre Channel supporting private loop connectivity in target mode.

87. The method of claim 82, wherein said at least one said host-side IO device interconnect port is Fibre Channel supporting public loop connectivity in target mode.

88. The method of claim 82, wherein said at least one said host-side IO device interconnect port is Parallel Small Computer System Interface (SCSI) operating in target mode.

89. The method of claim 82, wherein said at least one said host-side IO device interconnect port is ethernet supporting the Internet Small Computer System Interface (iSCSI) protocol operating in target mode.

90. The method of claim 82, wherein said at least one said host-side IO device interconnect port is Serial-Attached Small Computer System Interface (SAS) operating in target mode.

91. The method of claim 82, wherein said at least one said host-side IO device interconnect port is Serial Advanced Technology Attachment (SATA) operating in target mode.

92. The method of claim 82, wherein said external SVC issues a device-side IO request to said IO device interconnect controller, and said IO device interconnect controller re-formats said device-side IO request and accompanying IO data into at least one data packet for transmission to said group of PSDs through said device-side IO device interconnect port.

93. The method of claim 82 further comprising an enclosure management services mechanism that is implemented using intelligent circuitry which includes a CPU and runs a software program for managing and monitoring devices belonging to the computer system.

94. The method of claim 72, wherein the external SVC is equipped with the means and intelligence to dynamically adjust the distribution of the device-side I/O requests among the various PSDs 420 and/or IO device interconnects to further optimize a collective PSD/Interconnect bandwidth.

95. The method of claim 72, wherein said external storage virtualization controller is configured to provide a mapping that allows at least one section of the at least one LMU to be accessible to the host entity.

* * * * *